(12) United States Patent
Naware et al.

(10) Patent No.: US 9,984,409 B2
(45) Date of Patent: May 29, 2018

(54) SYSTEMS AND METHODS FOR GENERATING VIRTUAL CONTEXTS

(71) Applicant: eBay Inc., San Jose, CA (US)

(72) Inventors: Mihir Naware, Redwood City, CA (US); Jatin Chhugani, Santa Clara, CA (US); Jonathan Su, San Jose, CA (US)

(73) Assignee: eBay Inc., San Jose, CA (US)

( * ) Notice: Subject to any disclaimer, the term of this patent is extended or adjusted under 35 U.S.C. 154(b) by 241 days.

(21) Appl. No.: 14/580,072

(22) Filed: Dec. 22, 2014

(65) Prior Publication Data

US 2016/0180562 A1  Jun. 23, 2016

(51) Int. Cl.
*G06Q 30/06* (2012.01)
*G06F 3/0484* (2013.01)

(52) U.S. Cl.
CPC ..... *G06Q 30/0643* (2013.01); *G06F 3/04842* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 6,175,655 B1 * | 1/2001 | George, III | G06F 19/3437 358/451 |
| 8,659,596 B2 | 2/2014 | Corazza et al. | |
| 8,704,832 B2 | 4/2014 | Taylor et al. | |
| 8,736,606 B2 | 5/2014 | Ramalingam | |
| 8,749,556 B2 | 6/2014 | de Aguiar et al. | |
| 8,797,328 B2 | 8/2014 | Corazza et al. | |
| 2001/0026272 A1 | 10/2001 | Feld et al. | |
| 2007/0124215 A1 * | 5/2007 | Simmons, Jr. | G06Q 30/0603 705/27.2 |
| 2007/0182736 A1 | 8/2007 | Weaver | |

(Continued)

FOREIGN PATENT DOCUMENTS

| | | |
|---|---|---|
| CN | 103605832 A | 2/2014 |
| EP | 2187325 A1 | 5/2010 |

(Continued)

OTHER PUBLICATIONS

Karsch, Kevin, et al. "Rendering synthetic objects into legacy photographs." ACM Transactions on Graphics (TOG). vol. 30. No. 6. ACM, 2011.*

(Continued)

*Primary Examiner* — Zhengxi Liu
(74) *Attorney, Agent, or Firm* — Schwegman Lundberg & Woessner, P.A.

(57) ABSTRACT

Techniques for generated and presenting images of items within user selected context images are presented herein. In an example embodiment, an access module can be configured to receive a first environment image. A simulation module coupled to the access module may process the environment image to identify placement areas within the image, and an imaging module may merge an item image with the environment image and filter the merged image in an erosion area. In various embodiments, the items and environments may be selected by a user and presented to a user in real-time or near-real time as part of an online shopping experience. In further embodiments, the environments may be processed from images taken by a device of the user.

20 Claims, 18 Drawing Sheets

(56) References Cited

U.S. PATENT DOCUMENTS

| | | |
|---|---|---|
| 2008/0201638 A1 | 8/2008 | Nair |
| 2009/0002224 A1 | 1/2009 | Khatib et al. |
| 2009/0018803 A1 | 1/2009 | Ko et al. |
| 2011/0191070 A1 | 8/2011 | Ramalingam |
| 2011/0292034 A1 | 12/2011 | Corazza et al. |
| 2011/0298897 A1 | 12/2011 | Sareen et al. |
| 2013/0173226 A1 | 7/2013 | Reed et al. |
| 2013/0317944 A1 | 11/2013 | Huang et al. |
| 2014/0257993 A1 | 9/2014 | Paolini |
| 2014/0267717 A1* | 9/2014 | Pitzer ............... G06F 17/5004 348/143 |
| 2014/0270540 A1 | 9/2014 | Spector et al. |
| 2014/0313192 A1 | 10/2014 | Corazza et al. |
| 2014/0368499 A1* | 12/2014 | Kaur .................. G06T 19/20 345/420 |
| 2016/0180449 A1 | 6/2016 | Naware et al. |

FOREIGN PATENT DOCUMENTS

| | | |
|---|---|---|
| WO | WO-2010060113 A1 | 5/2010 |
| WO | WO-2014182545 A1 | 11/2014 |
| WO | WO-2016106193 A1 | 6/2016 |
| WO | WO-2016106216 A2 | 6/2016 |
| WO | WO-2016106216 A3 | 6/2016 |

OTHER PUBLICATIONS

Criminisi, Antonio, Ian Reid, and Andrew Zisserman. "Single view metrology." International Journal of Computer Vision 40.2 (2000): 123-148.*

Photoshop Tutorial, "Placing an Image Inside of Another With Photoshop C56", archived on Sep. 9, 2014, retrieved from https://web.archive.org/web/20140909091905/http://www.photoshopessentials.com/photo-effects/placing-an-image-inside-another-with-photoshop-cs6/.*

"International Application Serial No. PCT/US2015/067009, International Search Report dated Feb. 26, 2016", 2 pgs.

"International Application Serial No. PCT/US2015/067009, Written Opinion dated Feb. 26, 2016", 6 pgs.

"International Application Serial No. PCT/US2015/067044, International Search Report dated Mar. 11, 2016", 2 pgs.

"International Application Serial No. PCT/US2015/067044, Written Opinion dated Mar. 11, 2016", 7 pgs.

"International Application Serial No. PCT/US2015/067106, International Search Report dated Jul. 5, 2016", 3 pgs.

"International Application Serial No. PCT/US2015/067106, Written Opinion dated Jul. 5, 2016", 13 pgs.

* cited by examiner

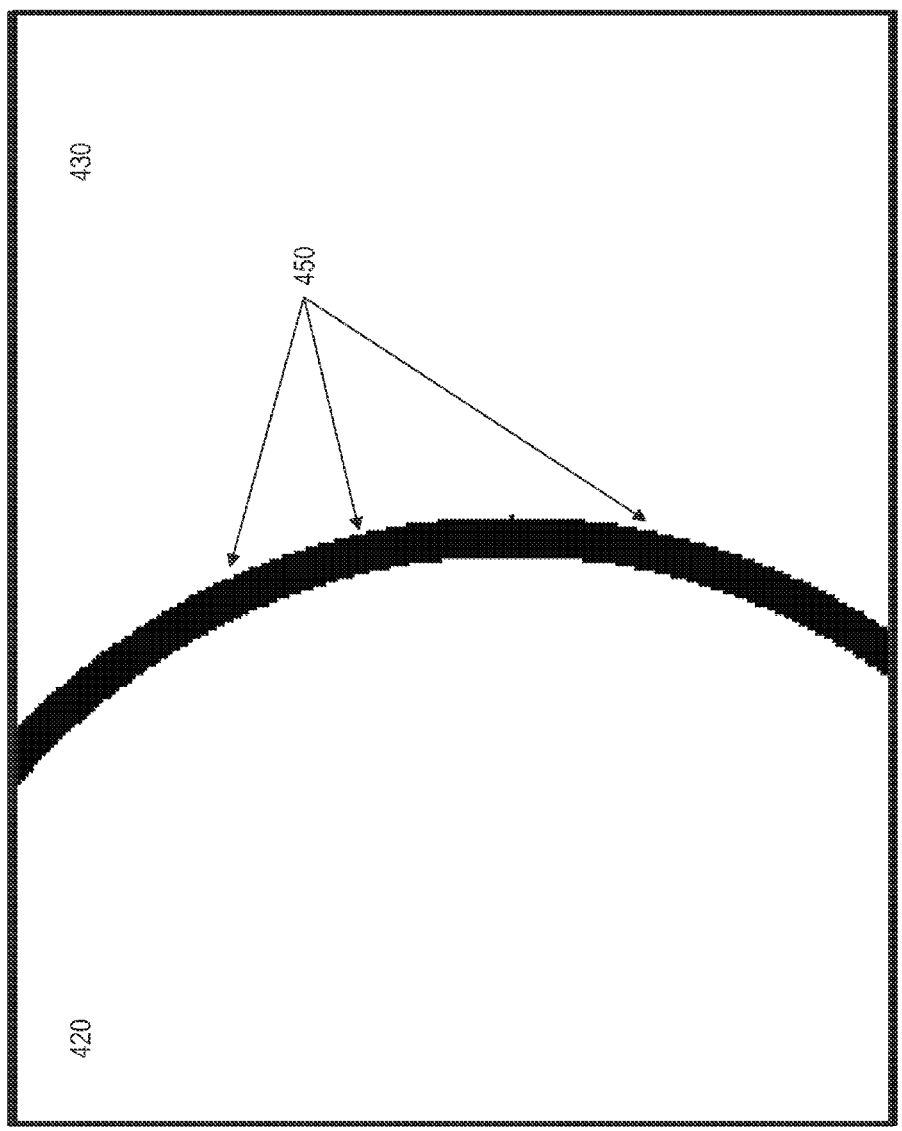

SYSTEMS AND METHODS FOR GENERATING VIRTUAL CONTEXTS

TECHNICAL FIELD

The present application relates generally to the technical field of computer modeling image processing and, in certain example embodiments, to generating virtual contexts for wearable item images in an online shopping environment.

BACKGROUND

Shopping for clothes in physical stores can be an arduous task and, due to travelling and parking, can be very time consuming. With the advent of online shopping, consumers may purchase clothing, while staying home, via a computer or any electronic device connected to the Internet. Additionally, purchasing clothes online can be different in comparison to purchasing clothes in a store. One difference is the lack of a physical dressing room to see if and how an article of clothing fits the particular consumer.

The systems and methods described in the present disclosure attempt to provide solutions to the problems presented above.

BRIEF DESCRIPTION OF THE DRAWINGS

FIG. 4C illustrates aspects of generation of virtual contexts in accordance with certain example embodiments.

DESCRIPTION OF EMBODIMENTS

Figure 1:
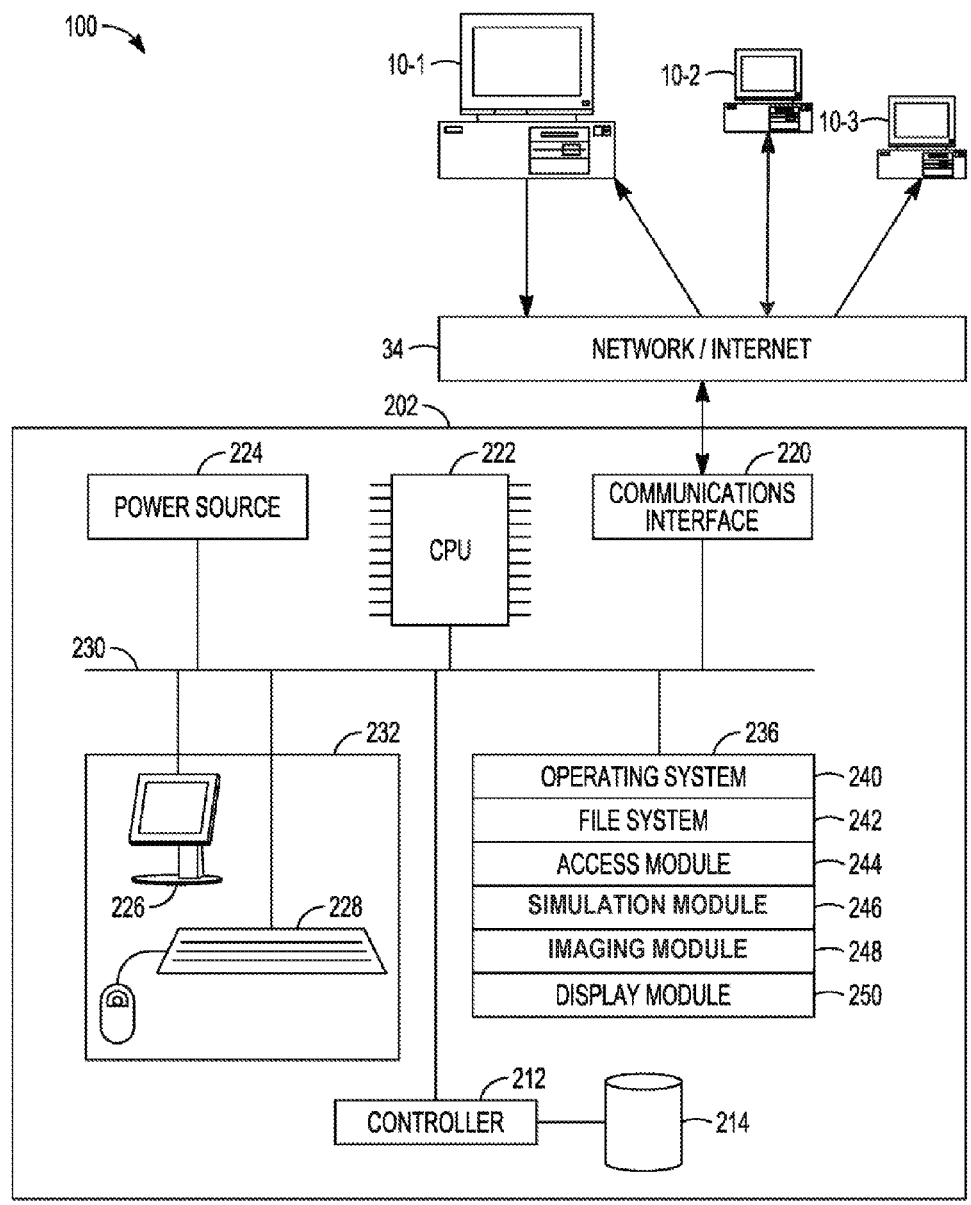
FIG. 1 illustrates an example system for generating virtual contexts in accordance with certain example embodiments.

Example systems and methods for image processing are described, including systems and methods for generating and displaying item images with an added selectable virtual context. Such context images may, in certain embodiments, be implemented as part of a virtual dressing room in an online storefront, merchant portal, or publication network.

Such systems may provide a contextual showcasing of a product as a way to enhance a user experience. Seeing a piece of apparel, footwear, clothing accessory, or jewelry in a context of different environmental situations can significantly enhance a shopping experience. Certain online shopping experience may suffer from an inability to directly experience an item, but providing a modeled image processed into multiple different contexts may counteract this deficiency of shopping remotely via a network, and may further provide a new experience that was previously unavailable to a shopper For example, a customer may be looking for a dress for a night out with friends. The customer may use a networked computing device to access an online store which offers a virtual dressing room with selectable background contexts. When the customer has selected several dresses as purchase options, the customer may also select a store provided background image from several different options, such as a formal dinner environment, a park environment, a beach environment, a home environment, and other such environments. An image associated with the environment is preprocessed prior to the client selection to identify one or more placement areas within the image that are suitable for superimposing an image of the dress. The image of the dress may be generated from a photograph or may be generated with a three dimensional model of the dress processed with a three dimensional model of a person to generate an item image from a computer model. When the system has both the image of the environment with an identified placement area, and the image of the wearable item, the system may superimpose the image of the wearable item on the image of the background based on the placement areas. Image filtering may then be performed on the composite image to generate a coherent representation of the item in the environmental context. A user interface on the customer's device may enable the customer to perform the same process for each of the selected dresses to switch back and forth between representations of each dress selected by the user in the selected environment. Similarly, a user may switch between different environments for the same dress, in order to view the dress in different contexts.

In other example embodiments, a user may provide the context information and environment image from a photograph taken by the user. For example, a user may take a photograph with a mobile device, and have that photograph processed as an environment image with an associated placement area as discussed above. The image of the dress may then be added to the user's environment image using the same processing described above for a system provided environment image. In certain embodiments, if the system may provide an initial placement area to position the item within the environment image, along with other pre-computed placement areas in the environment image, and a user interface may be used to move the wearable item image to different placement areas within the environment image.

Various such embodiments may improve the efficiency of network usage for providing item modeling in a user selected context, may generate efficiencies in processor usage based on image processing optimizations, and may enhance an online shopping experience. When these effects are considered in aggregate, one or more of the methodologies described herein may obviate a need for certain efforts or resources that otherwise would be involved presenting images in different contexts, with distributed resource usage optimized. Efforts expended by a user in generating 3-D models may be reduced by one or more of the methodologies described herein. Computing resources used by one or more machines, databases, or devices (e.g., within different elements of the system 100) may similarly be reduced or optimized. Examples of such computing resources include processor cycles, network traffic, memory usage, data storage capacity, power consumption, and cooling capacity.

FIG. 1 is a block diagram illustrating a system 100 in accordance with example embodiments. The system 100 includes networked devices 10 connected to a computing device 202 via a network 34 (e.g., the Internet). The computing device 202 typically includes one or more processing units (CPUs) 222 for executing modules, programs, or instructions stored in a memory 236 and thereby performing processing operations; one or more communications interfaces 220; the memory 236; and one or more communication buses 230 for interconnecting these components. The communication buses 230 optionally include circuitry (e.g., a chipset) that interconnects and controls communications between system components. The computing device 202 also optionally includes a power source 224 and a controller 212 coupled to a mass storage 214. The system 100 optionally includes a user interface 232 comprising a display device 226 and a keyboard 228.

The memory 236 includes high-speed random access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 236 may optionally include one or more storage devices remotely located from the CPU 222. The memory 236, or alternately the non-volatile memory device within the memory 236, comprises a non-transitory computer-readable storage medium. In some example embodiments, the memory 236, or the computer-readable storage medium of the memory 236, stores the following programs, modules and data structures, or a subset thereof: an operating system 240; a file system 242; an access module 244; a garment simulation module 246; an imaging module 248; and a display module 250.

The operating system 240 can include procedures for handling various basic system services and for performing hardware-dependent tasks. The file system 242 can store and organize various files utilized by various programs. The access module 244 can communicate with devices 10 via the one or more communications interfaces 220 (e.g., wired, wireless), the network 34, other wide area networks, local area networks, metropolitan area networks, and so on. Additionally, the access module 244 can access information for the memory 236 via the one or more communication buses 230.

The simulation module 246 can segment a two dimensional image to identify objects and surfaces within a two dimensional image. Simulation module 246 can additionally process such two dimensional images of an environment to identify spaces within the environment where an item or a body wearing the item may be placed. Additional details of such segmenting and placement processing are discussed below, particularly with respect to FIGS. 2-4.

In addition to processing images of an environment and a wearable item, simulation module 246 may additional use body models which may be based on a user or another person to represent a body that is wearing an item in a context image. Simulation module 246 may thus generate a three-dimensional body model based on the body measurement of a person, a photograph of a person, or other information associated with a person. Additionally, the garment simulation module 246 can position the body model inside the garment model. Moreover, the garment simulation module can calculate simulated forces acting on garment points associated with the garment model based on the positioning of the body model inside the garment model. Such modeling may generate an accurate representation of the wearable item as worn by a body model, and may then be used in an environment image.

While simulation module 246 may deal with the processing of individual elements including an item image, and environment image, and a body wearing the item, imaging module 248 deals with merging these elements into a single item context image. Imaging module 248 can generate an image of an item using superimpose and image filtering processes to merge wearable items with an environment and filter the merged image to generate a consistent image without sharp edges that detract from the presentation of the wearable item within the context environment. Additional details of simulation modules such as simulation module 248 are also discussed below.

The display module 250 can be configured to cause presentation of the generated image on a display of a device. For example, the display module can present a set of wearable items for selection by a user, a set of environments for selection by a user, and an item context image that merges the item and environments selected by a user. A user interface may enable a user to control the image output using display module 250 in order to show different wearable items within the same context or to show a certain item within different contexts.

The network 34 may be any network that enables communication between or among machines, databases, and devices (e.g., the computing device 202 and the client device 10-1). Accordingly, the network 34 may be a wired network, a wireless network (e.g., a mobile or cellular network), or any suitable combination thereof. The network 34 may include one or more portions that constitute a private network, a public network (e.g., the Internet), or any suitable combination thereof. Accordingly, the network 34 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or a WiMAX network), or any suitable combination thereof. Any one or more portions of the network 34 may communicate information via a transmission medium.

The computing device 202 and the networked devices 10 (e.g., merchant device 10-1, the client device 10-2, the network server device 10-3) may each be implemented in a computer system, in whole or in part, as described below. Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect the figure detailing an example computing device below. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
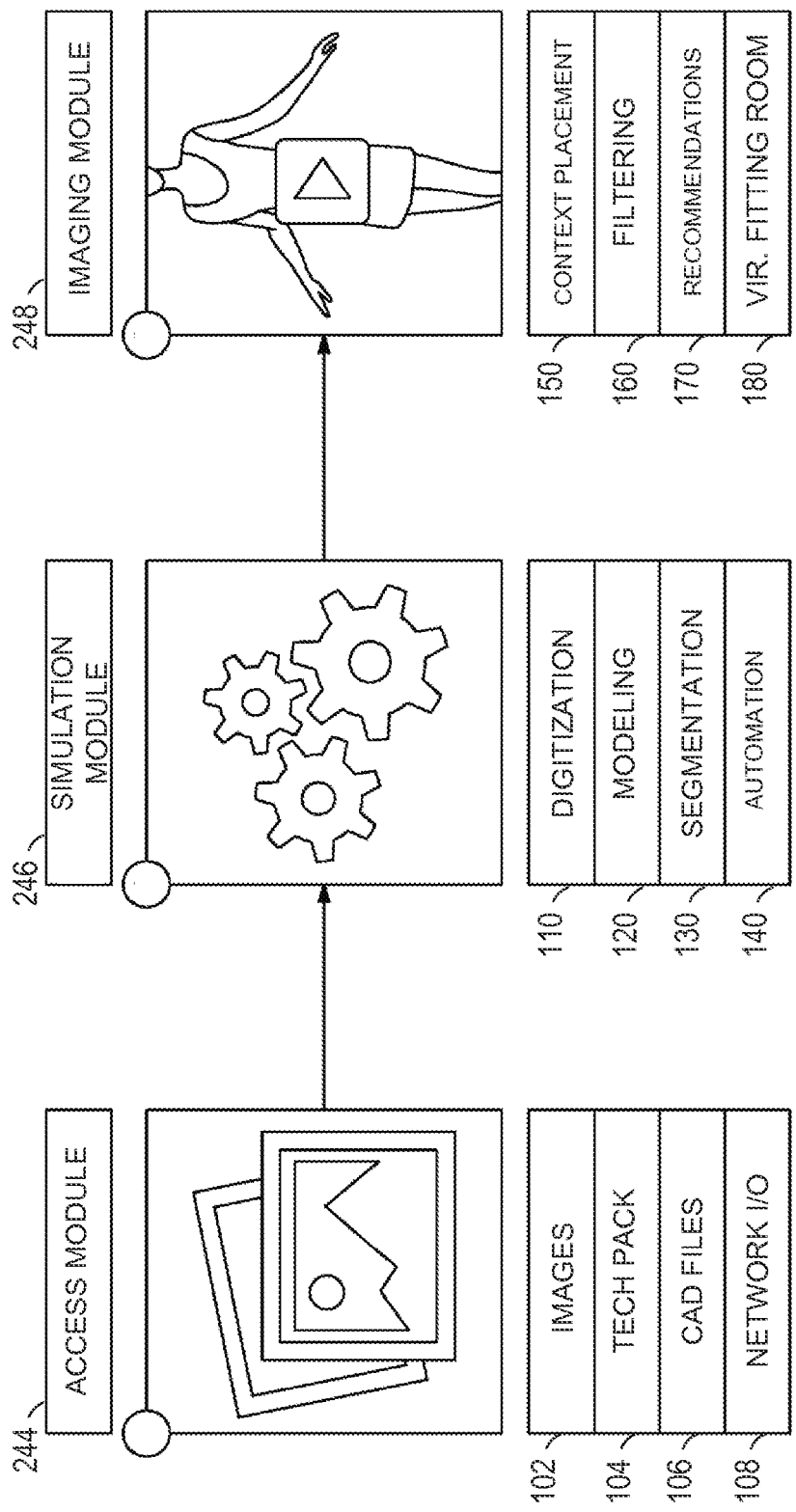
FIG. 2 illustrates aspects of a system for generating virtual contexts in accordance with certain example embodiments.

FIG. 2 then illustrates certain details one possible implementation of an access module, a simulation module, and an imaging module such as access module 244, simulation module 246, and imaging module 248 according to certain embodiments.

Access module 244 includes images module 102, technology package module 104, computer aided drafting (CAD) files module 106, and network interface module 108. Access module 244 is configured to receive a set of context data, the context data comprising a first environment image depicting a first environment. Simulation module 246 includes digitization module 110, modeling module 120, segmentation module 130, and automation module 140. Simulation module 246 is coupled to the access module 248 and is configured to segment the first environment image of the environment into a first plurality of segments, identify a first ground segment from the first plurality of segments, and determine at least a first placement area within the first environment image based on the ground segment and a first set of placement cues associated with the first plurality of segments. Imaging module 248 comprises context placement module 150, filtering module 160, recommendation module 170, and virtual fitting room module 180. Imaging module 248 is configured to superimpose a wearable item image on the first environment image to generate a first item context base image, with the wearable item image placed within the first placement area. Imaging module 248 is also configured to identify a first erosion area in the first item context base image, the first erosion area comprising at least a portion of a boundary between the first environment image and the wearable item image, and perform an image filtering process on the erosion area to generate a first context image comprising at least a portion of the wearable item image and a portion of the first environment image In other embodiments each of these modules may be implemented individually or together in any possible combination. Each of these modules is described in additional detail below with respect to FIGS. 3 and 4.

Figure 3:
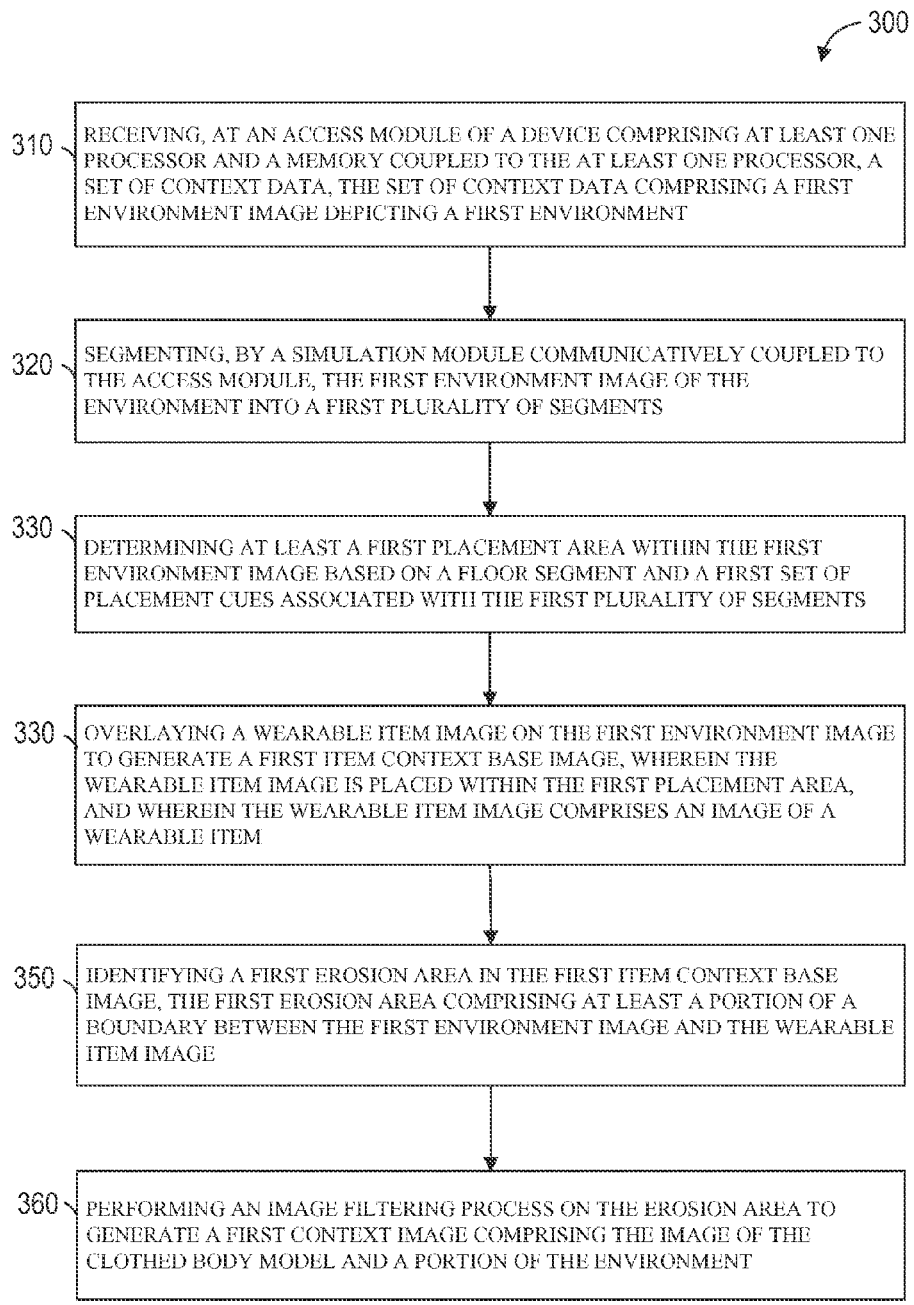
FIG. 3 illustrates a method for generating virtual contexts in accordance with certain example embodiments.

FIG. 3 illustrates one example method 300 according to the embodiments described herein. While method 300 is described with respect to the elements of FIGS. 1 and 2, method 300 may be implemented using alternative devices and modules in different embodiments.

Operation 310 involves accessing, at access module 244 of a device comprising at least one processor and a memory coupled to the at least one processor, a set of context data. The set of context data includes at least a first environment image depicting a first environment. In various embodiments, the set of context data may include any number of environment images, which may be received in a single continuous stream of data, or in separate communications each containing all or part of a single image of the environment images. Such environment images may be accessed from a number of different sources. Images module 102 may include environment images stored in a memory of the device that includes access module 244. Technology package module 104 may include various types of environment models and environment data, including three dimensional environment information that may be used to generate a three dimensional model of an environment, and to generate a two dimensional image of the environment as the environment image. Technology package module 104 may additionally include information about lighting, wind, body models, fabric models, or other data about an environment that may be used to generate an environment image in certain embodiments. CAD files module 106 may include CAD files describing an environment. In certain embodiments, CAD files module 106 and technology package module 104 may function together to render the environment image from a three dimensional computer model of the environment that is acting as one context. Additionally, in certain embodiments, any of the above sources of an environment image may be located remotely from the device, and network interface module 108 may communicate with database devices or other computing devices to retrieve any part of the set of context data.

In addition to the access of the set of context data, access module 244 may a set of wearable item data. This may be an image as described above, or may be model information as part of technology package module 104, including model details such as fabric values for a fabric model to be used in generating a wearable item image. This set of wearable item data may be CAD data to be stored by CAD file module 106. In other embodiments, this may be a scanned set of images or other data to be used in generating a model of an item that will then be used to generate a wearable item image.

Operation 320 then involves segmenting, by simulation module 246 that is communicatively coupled to the access module, the first environment image of the environment into a first plurality of segments. The coupling between simulation module 246 and access module 244 may be remote across a network, or operational communication enabled by one or more processors of the device. Segmentation of the environment image may be performed using segmentation module 130 to process the environment image. Such segmentation may use any image processing and machine vision techniques to identify surfaces and items in the environment image. Unsupervised image segmentation algorithms used by segmentation module 130 may process environment images without operator feedback during use. Examples of methods that may be used by segmentation module 130 include spectral clustering segmentation variations, mean shift segmentation, graph based clustering segmentation, and any other such segmentation method. In certain embodiments where placement areas are based on identification of unobstructed ground and background segments, simplified methods of segmenting may be used to distinguish such unobstructed ground and background areas from other areas without attempting to further segment complex obstructed areas in an image. In embodiments where further segmentation of complex obstructions is performed, this may additionally involve information about objects and object identification from modeling module 120, and models of objects generated by modeling model 120 and used by segmentation module 130 to identify segments of the environment image.

Operation 330 then involves determining at least a first placement area within the first environment image based on a ground segment and a first set of placement cues associated with the first plurality of segments. In a simplest embodiment, a placement area may be identified by a rectangular area within the environment image where only a ground surface and one or more background wall surfaces are visible. In certain embodiments, placement cues may include proximity to objects that may be foreground or blocking objects for an item to be superimposed in a placement area. In certain embodiments, placement cues may be size details and object complexity details with objects that may be background objects or objects in the middle of the environment. In certain embodiments, a ground segment may additionally be determined from cues including some or all of the placement cues. For example, certain linear lines identified from image recognition algorithms may be extrapolated to a vanishing point and used to determine walls, floors, ceilings, or other aspects of a room. In other embodiments, orientation of expected or identified items such as faces, objects on a flat surface, standing water, or other such items may be used to orient an image and determine a downward or gravitational direction within the context of the image, and a ground segment may be identified as a flat surface at an elevation contextually determined to be a ground in order to distinguish a ground segment from a table segment. Placement of furniture, floor plants, rug surfaces, or other elements may be used as cues to identify a ground segment and distinguish a ground segment from other flat surfaces such as table and bar surfaces.

In certain embodiments, operation 330 may involve an identification of multiple placement areas. For example, in one embodiment, determining at least the first placement area includes operations to identify a plurality of unobstructed portions of the first ground segment and for each of the plurality of unobstructed portions of the first ground segment, determine an unobstructed distance from the unobstructed portion toward a ceiling segment. Unobstructed portions of the ground which do not have a sufficient unobstructed area above them may be rejected as candidates to be associated with a placement area. A subsequent operation may then involve identifying a plurality of placement areas comprising the first placement area from the plurality of unobstructed portions of the first ground segment and the associated unobstructed distance toward a ceiling, sky, or upper image segment for each unobstructed portions. In other words, each placement area will be associated with a different unobstructed portion of the ground in the environment image. Each unobstructed portion of the ground will also have open space for a certain distance above the portion of the ground, and the perspective to this portion above the ground is not block from the view of the environment image. The simulation module 246 will, in such an embodiment, then select the first placement area from plurality of placement areas based at least in part on a proximity of the placement area to a set of obstruction segments and a set of relevant context segments of the plurality of segments.

All placement areas that meet a threshold set of placement characteristics may be passed as placement information to an imaging system, with a user having a user interface input to move the item to different placement positions within the environment image. In other embodiments, each placement position may be given a placement score based on the environmental cues. Such environmental cues may be derived from segments having a context value within the environment image. For example, placement areas in a complex portion of an image with higher or more irregular special frequency content may receive a lower score. A placement area with a higher score may be selected as the only placement area, or a selected number of placement areas with higher scores may be selected. In certain embodiments, a user interface may be provided for a system operator to interface with simulation module 246 to provide the system operator with selection options for placement areas in an environmental image being processed by simulation module 246. In other embodiments, such a selection may be made automatically by automation module 140 using any criteria described above.

Operation 330 then involves superimposing, by imaging module 248, a wearable item image on the first environment image to generate a first item context base image, wherein the wearable item image is placed within the first placement area, and wherein the wearable item image comprises an image of a wearable item.

The initial superimposing may simply involve replacing pixels of the environment image with pixels of the wearable item image in the placement area. In certain embodiments, this may involve a more complex process. For example, in one embodiment, the wearable item image and the environment image may have different resolutions and scaling. The superimposing may thus involve an operation to scale an item size of the wearable item image to match a placement size of the first placement area and to match an item scale to an environment scale. Cues similar to the placement cues may be used from various segments or details identified during segmentation of the image. Such sizing cues may also be derived independently by imaging module 248. This may include analyzing a size of bodies, chairs, doors, or other standard objects within the environment image to determine the scale of the environment image. The wearable item image may then be scaled to match the scale of the environment. In certain embodiments, the scale may be provided as metadata or model data associated with either the environment, the wearable item, or both. Downsampling and/or pixel interpolation may then be used to match the pixel spacing in the scaled wearable item image.

Pixels of the scaled sample-adjusted wearable item image may be used to overwrite at least a portion of the first placement area of the first environment image. The wearable item image may not cover the entire placement area, and may, in certain embodiments, extend beyond the placement area by an amount determined by system settings. In other embodiments, the placement area is a firm limit on placement of pixels from the wearable item image that are used to overwrite pixels from the environment. The wearable item may be an article of clothing, jewelry, or clothing accessory being draped over a body in the wearable item image. In other embodiments, the body may be part of the environment image, and the wearable item image may be placed on a body segment within the environment when the body segment is identified as a placement area. In certain embodiments, the wearable item image may be received in the same manner as the environment image described above is received. In other embodiments, however, digitization module 110 may be used to gather information about an actual physical embodiment of the wearable item. This may include multiple image of the wearable item as well as any other sensor data about the wearable item. Digitization module 110 may then be used to generate a computer model of the wearable item, and a wearable item image may be generated from the wearable item model created by digitization module 110. Additional details related to such wearable item models are described below.

Operation 350 then involves identifying a first erosion area in the first item context base image. The first erosion area includes at least a portion of a boundary between the first environment image and the wearable item image in the base context image that includes the wearable item image superimposed on the environment image. In one embodiment, the boundary between the first environment image and the wearable item image is determined by identifying boundary pixels. A boundary pixel is identified by identifying each pixel of the first item context base image that is a superimposed pixel from the wearable item image and adjacent to at least one pixel from the first environment image.

Once the boundary is identified, the first erosion area may be determined in a variety of ways. In one embodiment, an erosion distance is determined, and every pixel within the erosion distance of the boundary is within the erosion area. For example, every pixel that is within seven pixels of a boundary pixel may be part of the erosion area. In other embodiments, the erosion distance may be determined as a function of characteristics of the context base image. This may include the dimensions and resolution of the context base image, with a context base image having more pixels using an erosion distance that is also a greater number of pixels.

In one embodiment, the erosion distance is based on a ratio of the wearable item image size to an environment image size. In such an embodiment, additional operations may be part of identifying the first erosion area. Such operations may include determining a ratio of a size of the wearable item image to a size of the first environment image, selecting an erosion distance from an erosion distance table based on the ratio, and selecting every pixel within the erosion distance of the boundary pixels as a set of erosion pixels comprising the first erosion area. An erosion distance table may be generated by a system operator based on a number of different characteristics images to be merged, including size ratios, color contrasts, brightness contrasts, or other variations in characteristics between an environment image and a wearable item image to be merged into a context image. In other embodiments, a formula may be used, with values for different characteristics put into a function to determine a value for an erosion distance.

In still further embodiments, differences and variations between colors and patterns near the boundary area may be used to modify the erosion distance. For example, if a threshold spatial frequency is found within the erosion area, the erosion distance may be increased by a preset value.

Operation 360 then involves performing an image filtering process on the erosion area to generate a first context image comprising the image of the clothed body model and a portion of the environment. In certain embodiments, a clothed body model may be generated by merging a particular wearable item image with a body model image is in a similar way to the merging of a wearable item image (which may include the clothed body model image) with an environment image. In other embodiments, three dimensional computer models of a wearable item may be merged with three dimensional models of a body to generate an image of a clothed body model draped in a wearable item. Additional details related to generation of a clothed body model that may comprise a wearable item model are described below. In certain embodiments, such an image filtering process may be a low-pass filter to filter high special frequencies found within the erosion area. This may be, for example, a smoothing process performed by transforming each pixel of the set of erosion pixels that are within the boundary area using a Gaussian filter. In other embodiments, the smoothing process may use an Isotropic box filter that is an approximation of a Gaussian filter for efficiency. In various other embodiments, any filtering operation may be used that generates a consistent presentation within the context image and filters out a visible boundary in presentation of the generated image of the wearable item with the background environment as context.

Figure 4A:
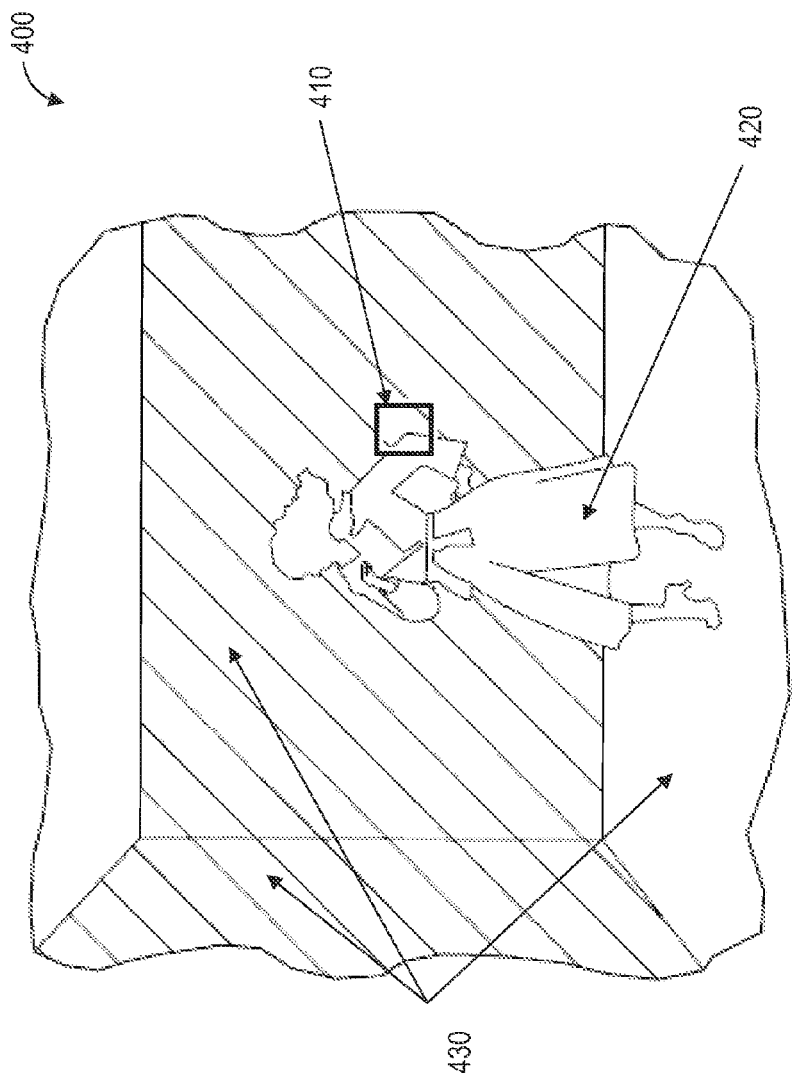
FIG. 4A illustrates aspects of generation of virtual contexts in accordance with certain example embodiments.
Figure 4B:
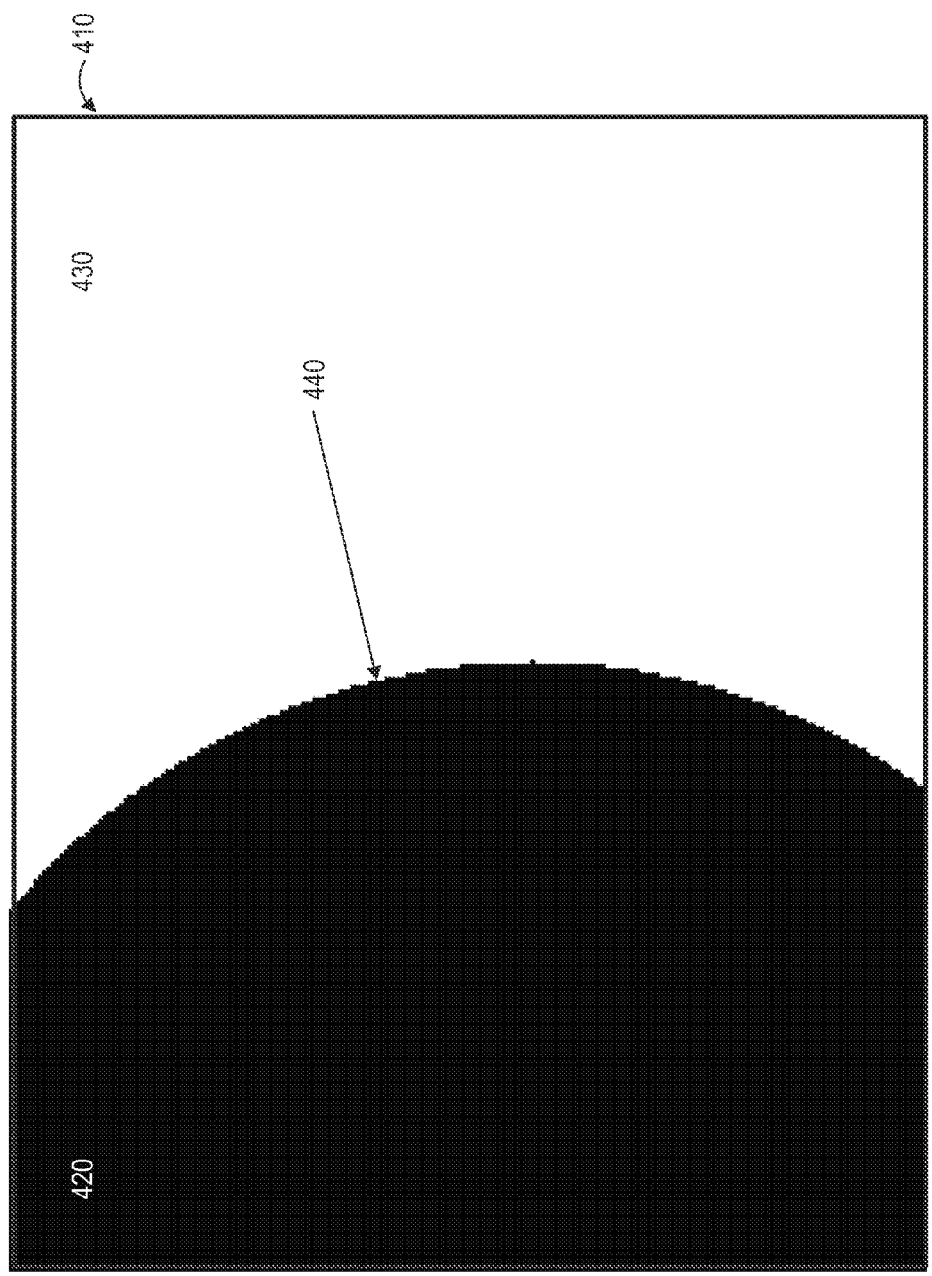
FIG. 4B illustrates aspects of generation of virtual contexts in accordance with certain example embodiments.
Figure 4D:
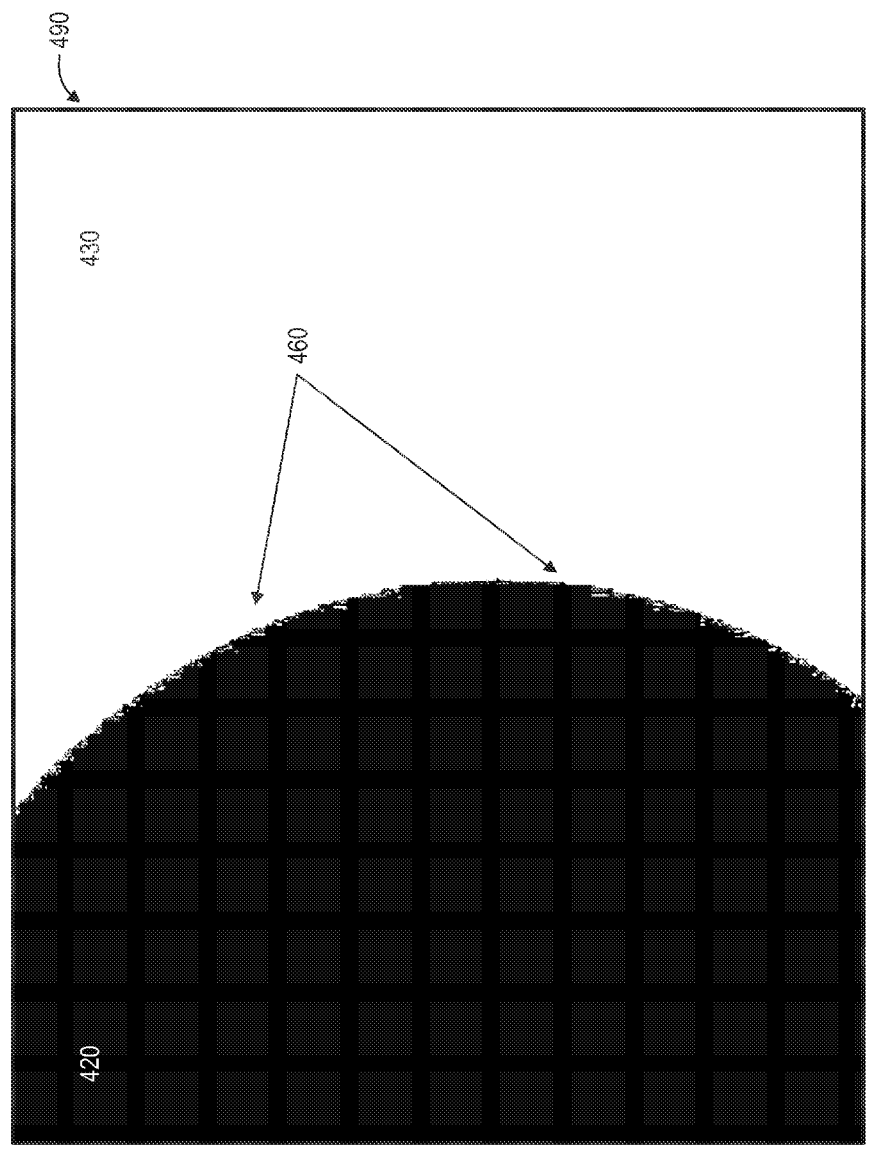
FIG. 4D illustrates aspects of generation of virtual contexts in accordance with certain example embodiments.

FIGS. 4A-4D illustrates filtering of an erosion area in an item context base image 400 according to certain example embodiments. Item context base image 400 includes wearable item image 420 superimposed on environment image 430. Area 410 is an area shown in detail in FIGS. 4B-4D. FIG. 4B shows a base unfiltered image of area 410, which includes pixels from wearable item image 420 and pixels from environment image 430. Boundary 440 between wearable item image 420 and environment image 430 is a sharp edge. If these areas of environment image 430 and wearable item image 420 have any differences, the boundary 440 will be plainly visible when item context base image 400 is displayed on an output display of a device. FIG. 4C then shows a boundary area 450 which includes pixels on both sides of boundary 440, such that the width of boundary area 450 at the narrowest distance is twice an erosion distance, which is the distance away from the boundary encompassed by the erosion area. In FIG. 4D a portion of an item context image 490 has pixels from wearable item image 420 and environment image 430, but includes eroded pixels 460 in the erosion area that have been filtered with an image filtering process as described above. This reduces the sharpness from boundary 450 in item context base image 400 to present a more coherent and less jagged and abrupt transition in the portion of item context image 490.

An alternative embodiment to method 300 described above may be explained as follows, with pre-processing performed on the environment images and superposition of environment and wearable item images performed at run-time in response to user selections. The set G represents the set of images of draped garments, footwear, or other wearable items that the user is interested in trying out in different scenarios. The set G is provided as input at run-time to the algorithm. G may also consist of rendered or synthesized assets such as rendered virtual garments described further below.

C represents a set of contexts represented by context data. This may include, for example, a cocktail bar setting, a beach, a business meeting, a work environment, and so on. The set C is accessed for pre-processing so that it can be made ready for run-time processing. The context data set {C1, C2, . . . CN} represents N environment images, where each environment image is associated with a different context scenarios.

O represents output set of context item images, which may also be represented as C×G. C×G is the set of all context or environment images merged with all garment or wearable item images. A set with three garments and five contexts will have a set of fifteen merged context images. For a chosen environment or context Cj and wearable item or garment image Gk, the output is an image formed by superimposing in a visually admissible manner on the fly to create the output image Ojk that is displayed on a user's device. In some cases, Cj might transferred to the user's device for performance of C×G at the user's device. In other cases, Gk might be uploaded to the processing farm, and the output image Ojk at the appropriate resolution is transferred back to the user's device.

For a given environment image Cj, Wj×Hj represents the width and height of the environment image in pixels, and the output item context image O is the bounding box of the super-imposable region (WRj×HRj) where the Garment can be pasted.

First, Cj is segmented into different regions such as background, foreground, ground, ceiling, fixture, and other such regions. Next, one or more rectangular regions within the image where the garment might be super-imposed are identified. Such regions may be identified as placement regions that start from the ground and extend up from the ground towards the ceiling to a certain distance from the ground. In some cases, such as in outdoor environments or scenes with many other objects, an environment image may be flagged as complex for operator review, or handed to an additional analysis module for further automatic processing. In certain embodiments of a complex set of segments, an initial analysis may identify a set of best position regions, and may present each region as an option for a user, such that the user may cycle through the positions, with the superposition and erosion area filtering during each cycle.

Once the one or more placement regions are identified by pre-processing for each context image Cj, the system stores the coordinates of the placement region (WRj×HRj) where the garment image Gk will be super-imposed during runtime.

Gk represents the garment and WGk×HGk represents the bounding box of the garment in question. Once a user has selected a garment represented by garment image Gk and an environment or context image represented by Gk, the system computes an opacity map Tk for both Gk and Cj. Each pixel of Tk stores a 1 or 0, where 1 represents the fact that the pixel belongs to the garment, while 0 represents the fact that the pixel belongs to the background of Gk. This opacity image Tk can be computed from the corresponding images using standard opacity determinations.

Gk is then scaled to match Cj. This involves scaling Gk from WGk×HGk to WRj×HRj. The scaled image is referred to as Gk', and the accompanying opacity map Tk is also scaled to produce Tk' of the same resolution as Gk'.

The system extracts a boundary of opaque pixels in Gk', and erodes the pixels within an erosion distance of 2% of length of diagonal of bounding box in pixels, with a minimum erosion distance of two pixels. This means that the pixels within the erosion distance of the boundary are flagged as eroded pixels. This is performed to achieve smooth blending of Cj and Gk.

The output image Ojk is then created as follows. Pixels outside WRj×HRj are copied as such from Cj to Ojk. Copying a pixel comprises copying the RGB color values from the source to the destination image. For pixels within WRj×HRj for which Tk==0, the pixel values are copied from the source to the destination. For pixels for which Tk=1, and not part of eroded pixels, the output pixel is populated by copying from the appropriate location in Gk'.

For pixels with Tk=1, and part of eroded pixels, the system identifies all pixels within the erosion distance of the boundary. Only pixels that have been assigned a value in the output image Cjk are included, while the rest are ignored. An average value or filtered value of each of the pixels identified in the above step is then computed, and each pixel value is assigned to the average or filtered value, dependent on the type of image processing used in the erosion area.

Following these operations, all pixels have been assigned a value, and an output image Ojk with Wj×Hj pixels is generated. For test images with Wj=1920, Hj=1080, WRj=300 and HRj=700, approximately 95,000 pixels in the identified bounding boxy have Tk=1, and an average value of the erosion distance is 15. For computation on a desktop processor, this results in a processing time between 1 and 10 milliseconds. For computation on a smart phone, the compute time is approximately 50-200 milliseconds.

Figure 5:
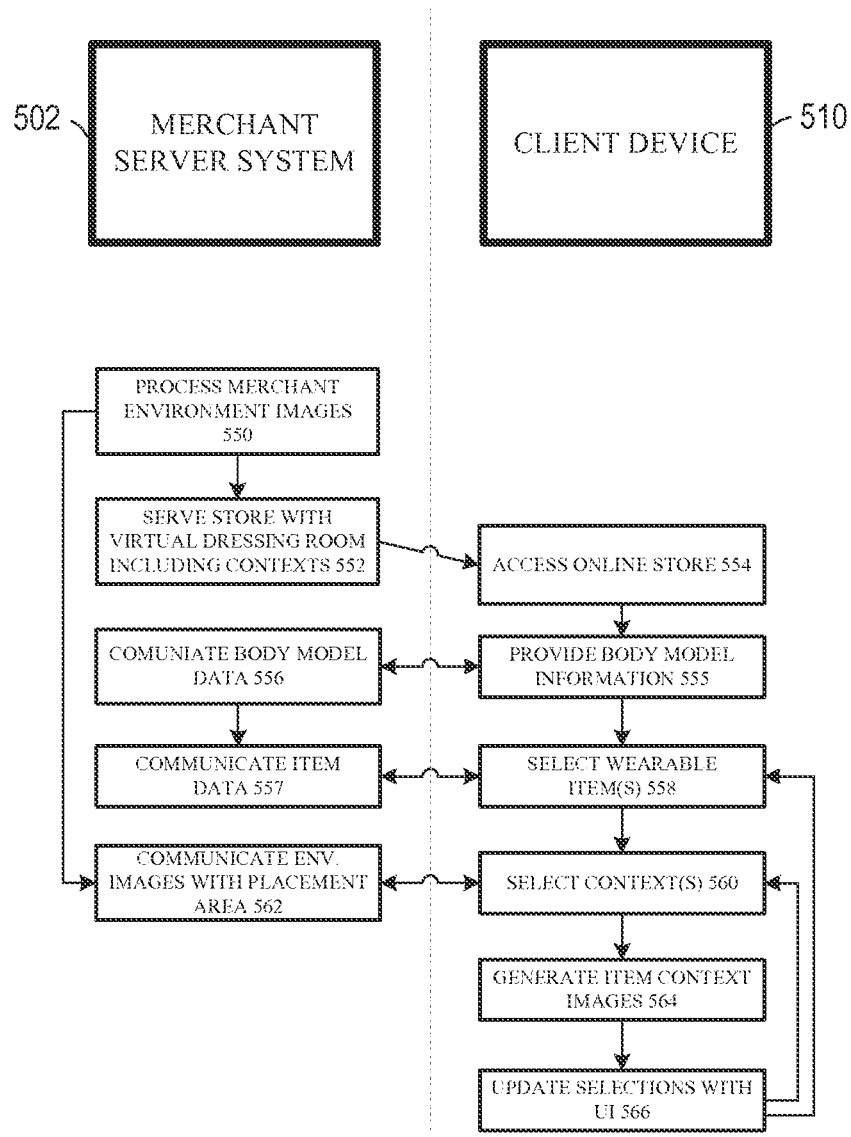
FIG. 5 illustrates a method for generating virtual contexts in accordance with certain example embodiments.

FIG. 5 then describes an implementation where a client device 510 accesses a merchant server system 502 as part of an online shopping transaction. In operation 550, the merchant server system 502 processes context data in a pre-processing operation to access environment images and identify placement areas within the environment areas. In certain embodiments, this may be performed by an access module similar to access module 244 and a simulation module similar to simulation module 246 both operating on merchant server system 502. In operation 552, merchant server system 502 serves an online store with a virtual dressing room including context. In operation 554, client device 510 accesses the online store.

As part of virtual dressing room interactions, a user of client device 510 selects a body model in operation 555. This may involve use of a default model without a user selection of a specific input, or it may involve communication of user measurements to merchant server system 502. Body model data selected by client device 510 is communicated to client device 510 and if a custom body model is selected, to a modeling module of merchant server system 502 as part of operation 556. Body model data may include measurements for a generic model. Body model data may include CAD files of a body shape and size. Body model data may include a three dimensional model generated from two dimensional images. Body model data may include a body model size and shape estimated from a user's selected clothing that is identified as well fitting. Additional details of such modeling are described below. In operation 558, a user browsing the online store selects one or more wearable items in operation 558, and receives item data communication from merchant server system 502 in operation 557. In operation 560, a user of client device 510 selects a context, and in operation 562, merchant server system 502 communicates an environmental image with placement area information to client device 510. Client device 510 then uses the environment image and the item data comprising a wearable item image to generate an item context image that is displayed on an output display of client device 510 as part of the virtual dressing room interaction. In certain embodiments, the item context image is generated by an imaging module similar to imaging module 248 operating on client device 510. In operation 566, a user of client device 510 uses an interface of client device 510 to select an additional alternative context or wearable item. Updated item data or context data is received in response to this selection, and used to repeat the process of generating item context images at client device 510. This process proceeds until the client device exits the virtual dressing room. This may occur with a payment process executed using merchant server system 502, or with client device 510 terminating a connection to merchant server system 502 without completing a purchase.

In various different embodiments, modules of a system described in FIGS. 1, 2, 11, 12, and any other module described herein may be distributed in a system in various different ways. In one embodiment, a merchant computer such as merchant server system 502 may include an access module such as access module 244 and a simulation module such as simulation module 246, with a user device such as client device 510 including an imaging module such as imaging module 248. Any database elements may be stored at either device or in a networked device. Access modules and simulation modules in a merchant server system may communicate item data such as wearable item images, context data such as environment images, and any other data such as placement area information associated with an environment image, across a network between the merchant server system and the client device.

In another embodiment, an access module, a simulation module, and an imaging module may all be on a single device. For example, a mobile device such as a smartphone, a tablet, or a laptop computer may include each of these modules, and may communicate with a database or a merchant server computer to retrieve any information required by the system. In still further embodiments, any access module, simulation module, or imaging module operations described herein may be performed by both a server computer and a mobile device, with the place of operation for the distributed modules depending on the availability of processor cycles, memory storage area, network resources, battery power, or other computing resources at the mobile device.

Figure 6:
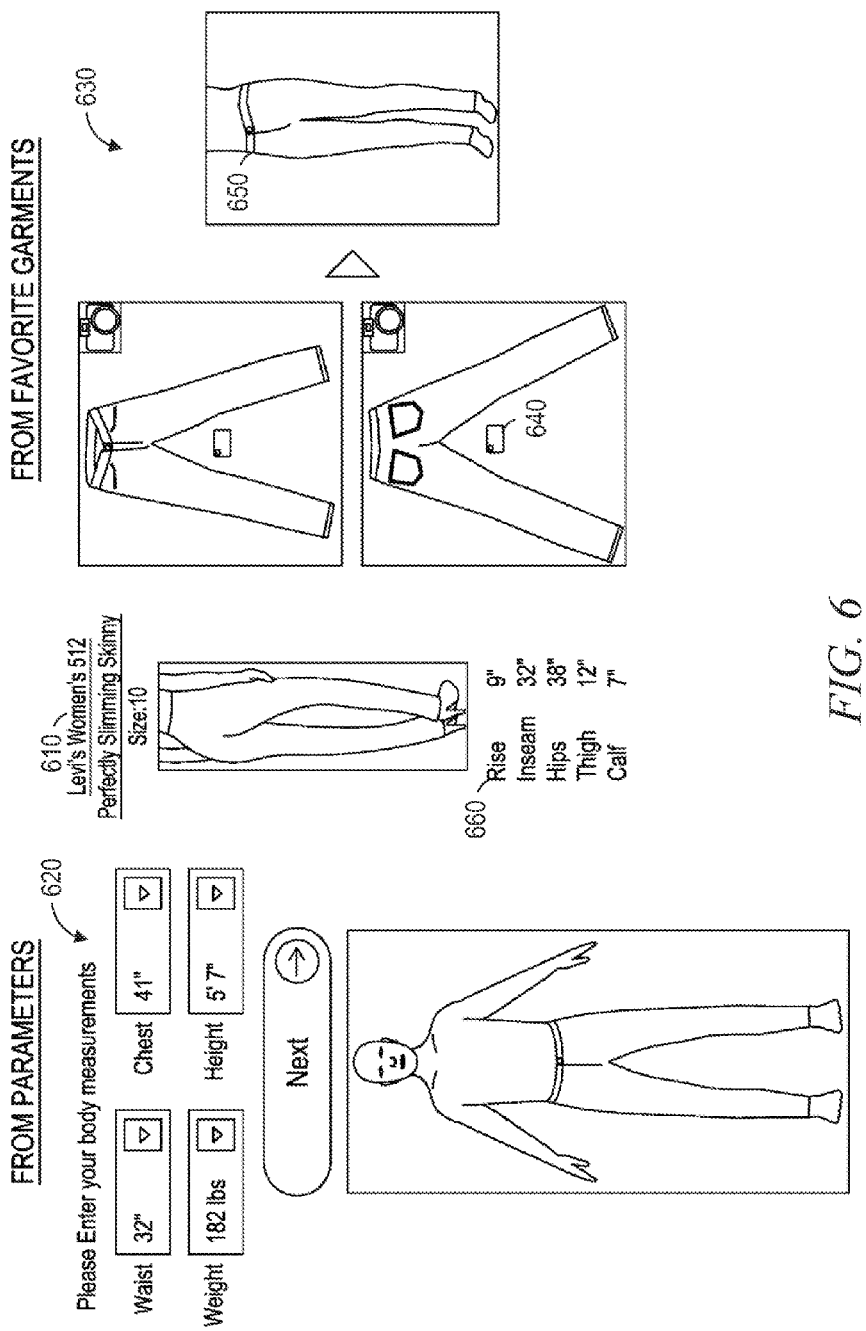
FIG. 6 illustrates an interface for generating a body model for use with virtual contexts in accordance with certain example embodiments.
Figure 7:
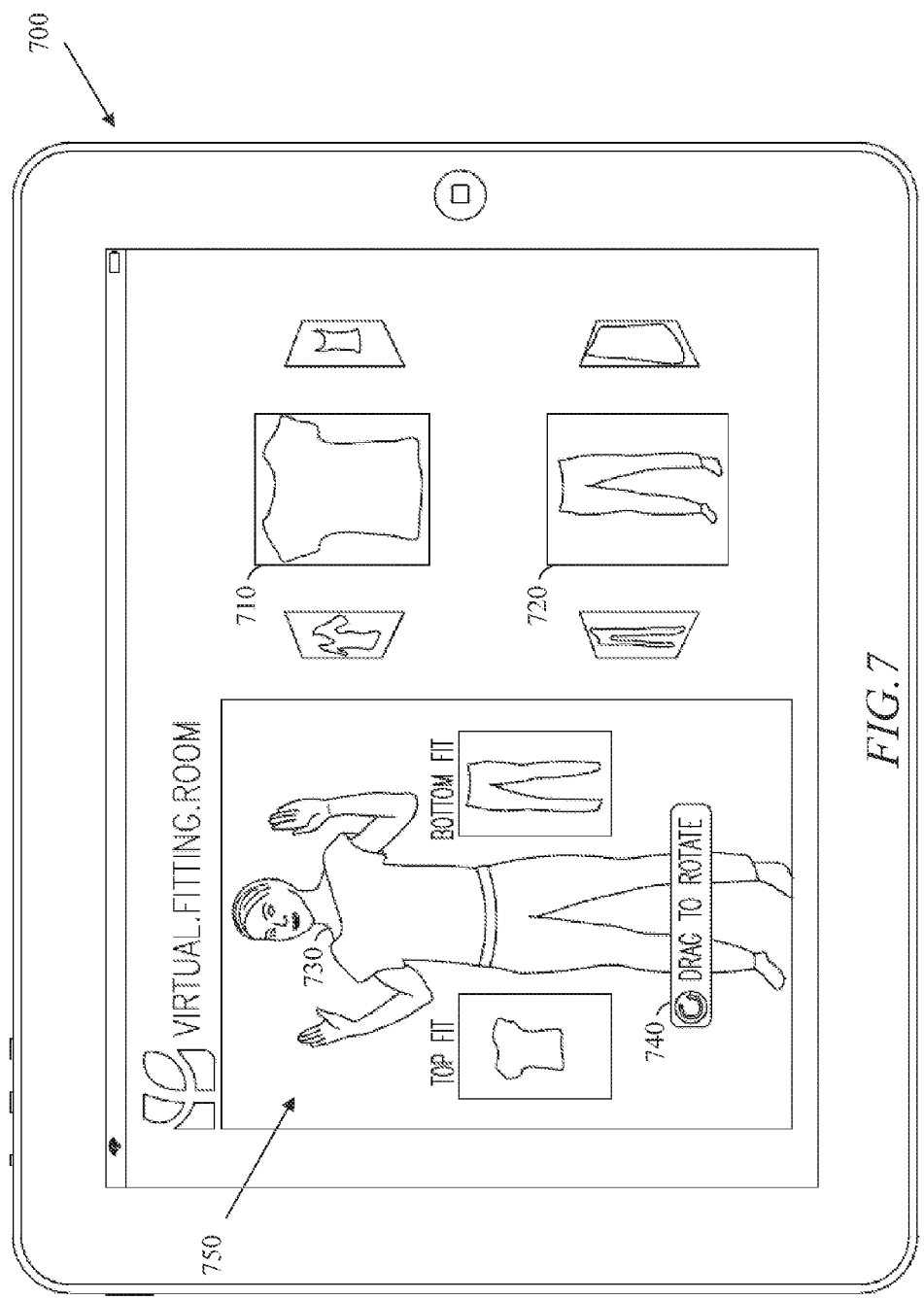
FIG. 7 illustrates aspects of a virtual fitting room that may be used with virtual contexts in accordance with certain example embodiments.
Figure 8:
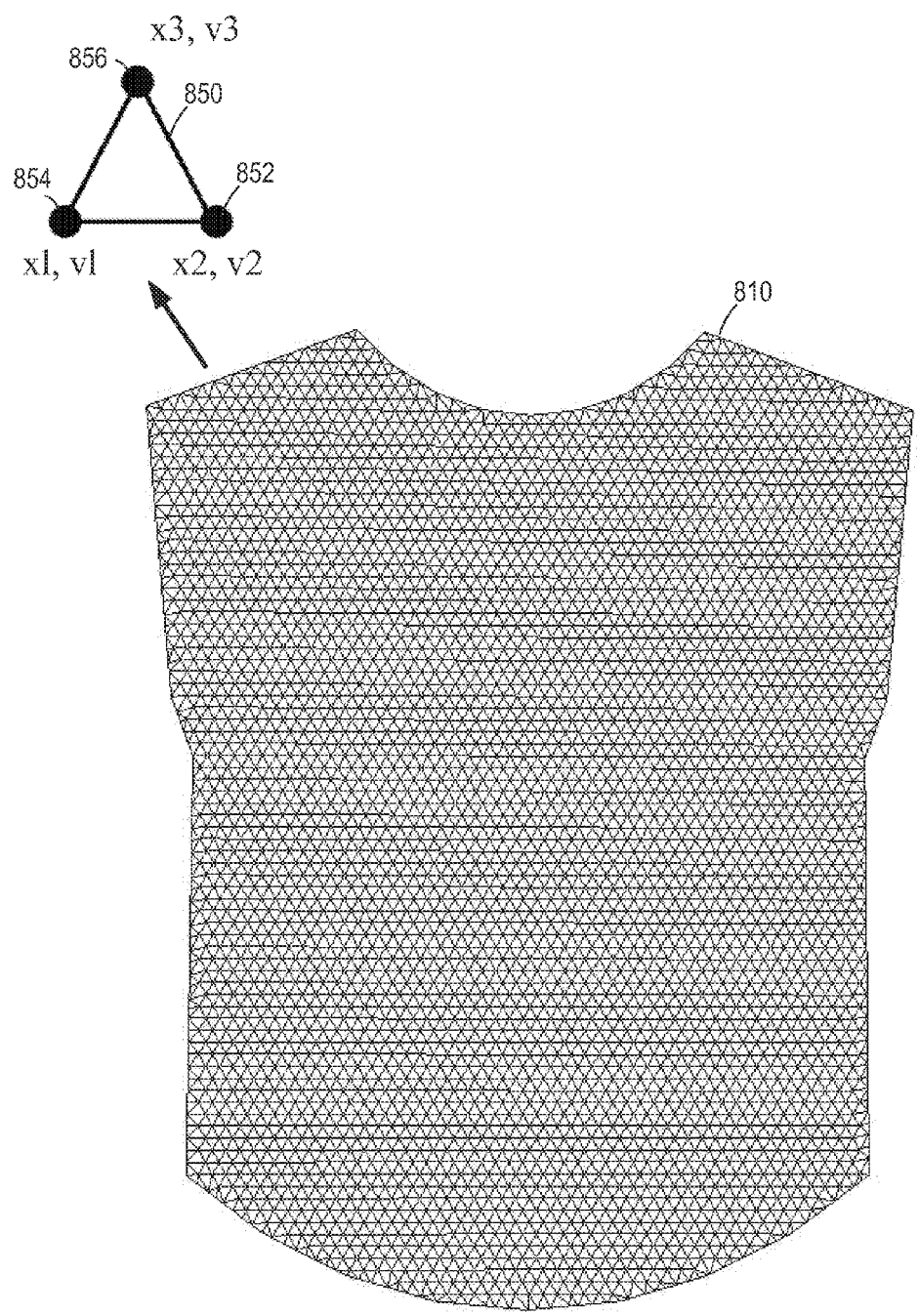
FIG. 8 illustrates aspects of a wearable item model that may be used with virtual contexts in accordance with certain example embodiments.
Figure 9:
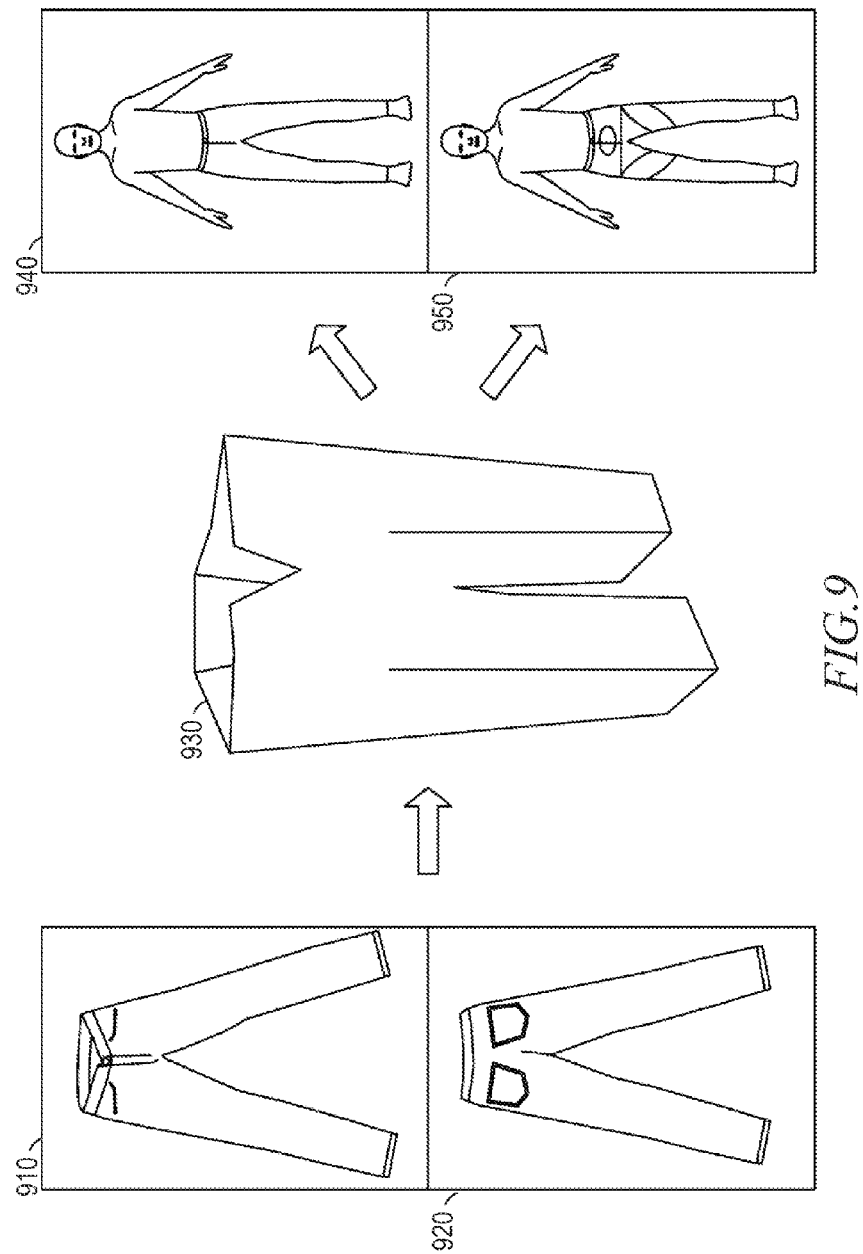
FIG. 9 illustrates aspects of wearable item image generation that may be used with virtual contexts in accordance with certain example embodiments.

As described above, certain embodiments may relate to presentation of wearable items in an interface of a virtual dressing room. This may include accessing size or body model information from a user, as described for operation 555 above. FIG. 6 below details aspects of size or body model information that may be implemented as part of a system. A virtual dressing room may also involve a user selecting garments or other items from a merchant online store as described in operation 558. FIGS. 7-9 detail aspects of garment selection and creation of garment models that may be used to generate wearable item images according to various embodiments. A virtual dressing room may also involve presentation of an item image with a contest and selection of contexts to associate with a selected wearable item as described in operation 560. FIGS. 10A-F illustrate aspects of context selection in an example embodiment.

FIG. 6 illustrates aspects of a system gathering body measurement information that may be used in a body model and further used to identify garment data to select or generate a wearable item image. In some embodiments, the body measurements of the user can be user inputs 620, such as waist, weight, chest, height, or other body measurements. In certain embodiments a garment portion of simulation module 246 can generate different three-dimensional body models based on the body measurements. Such body models may be three dimensional representations of a user or of an abstract person's shape. In certain embodiments, such a body model may comprise CAD data or three dimensional structures representing a body that may be used with garment models. Such a body model may then be used with a garment model to generate a three dimension model of a wearable item draped on a user, and this model may be used to render a wearable item image that may be accessed by an access module for use in generating item context images.

In other instances, the body measurements of a user can be received from photographs 630 using a calibration object 640. Calibration can assign an x, y, z position value to each pixel. If the garment is laid out on a planar surface, the system 100 may need the relative position of three points to compute the calibration (or projection mapping from image to object space). For example, using the calibration object 640, the system can extract the four corner points, and given the dimensions of the calibration object 640, the system 100 has enough information to compute the calibration. Based on the calibration, the system 100 can present the garment on an avatar 650 and display properties 660 (e.g., rise measurement, inseam measurement, hips measurement, thigh measurement, calf measurement) associated with the garment. Similarly, with a grid paper as a calibration object, the system can use the relative positions of three points to compute this calibration. Additionally, the body model can be generated based on purchase history and feedback. Feedback can include returns and acceptances of purchases, and the measurements or clothing models associated with kept purchases may be used to automatically generate a body model.

FIG. 7 illustrates the virtual fitting room example shown on a user interface output display of mobile device 700. In the virtual fitting room example, customers can mix and match clothes (e.g., shirts 710 and pants 720) virtually in-store, and digitally try on inventory on body model 730 to generate a wearable item image 750. User interface 740 may be used to generate wearable item images of body model 730 and selected wearable items shirt 710 and pants 720. Additionally, as shown, in certain embodiments a wearable item image may include a first wearable item, a second wearable item, and a body model. In embodiments where multiple wearable items are superimposed on a single environment, an erosion area may include not only pixels in an area within an erosion distance of the boundary between each item and the environment, but also the area within an erosion distance from an item boundary between pixels of the first item and pixels of the second item.

In addition to using an interface to accept body model information from a user to generate a body model that may be used to generate a wearable item image, a system may also access information for three-dimensional digital wearable item simulation, according to example embodiments. Such operation may involve determining the size of the garment and an operation for draping the garment on a body model.

In such embodiments an access module such as access module 244 can access, from a database, a three-dimensional garment model of a garment, the three-dimensional garment model including garment points that represent a surface of the garment. The accessed three-dimensional garment model of a garment can be stored in the garment model files of a memory device.

For example, the accessed three-dimensional garment model can be a tessellated three-dimensional garment model. The tessellated three-dimensional garment model can includes a group of vertices associated with points on the surface of the garment. The tessellated 3-D garment model of the garment can be received using the communications interface 220 via the network 34.

The garment points can be generated using a tessellation technique by the tessellation module. Tessellation can tile a garment into many tessellated geometric shapes to generate the tessellated garment with garment points. The tessellated geometric shapes can be stored in the extracted geometry files of a memory device. Optionally, when texture information is obtained from the accessed information at operation 410, the texture information can be stored in the extracted texture files of a memory device.

For example, as illustrated by shirt 810 of FIG. 8, a shirt can be tessellated with triangles (e.g., about 20,000 triangles when a triangle edge is around 1 centimeter), and the vertices of the triangles can be the garment points of the three-dimensional garment model. The garment points can include location information such as an x, y, and z position value. Additionally, the location information can be independent of the color and design of the garment. Access module 244 can then access a body measurement of a person. In some instances, the access module 244 can access a plurality of body measurements. The body measurement of the person can be received via user input. For example, the body measurement can include neck size, arm length, chest size, waist size, leg length, and so on. The list of parameters for women can include weight, height, bust, waist, and hips. Different female bodies can be generated based on the body parameter. Additionally, different bodies can also be created by interpolating between two bodies of specific measurements. The list of parameters is just representative, and is not intended to be exhaustive. Similarly, in some instances, the list can include a subset of the parameters listed. Simulation module 246 can then generate a three-dimensional body model based on the accessed body measurement.

Once the body measurement has been accessed, the system can create a set of 3-D human-like body models (e.g., static, animated, dynamic) for virtual dressing room. The simulation module 246 can position at least a portion of the generated three-dimensional body model inside the garment points. In some instances, positioning can include placing the garment on or around the body, given that the body may be fixed in some embodiments. In these instances, the garment can be stretch and deformed based on the simulation. The simulation module 246 can configure at least one processor among the one or more processors (e.g., the CPU 222) to position the body model inside the garment model.

By simulating the garment model on each male and female body model, the application can generate a realistic virtual dressing room experience to generate realistic wearable item images from item models. In some instances, simulation of the garment can include placing the garment around the body at an appropriate position, and running simulations based on calculations. The simulation can advance the position and other related variables of the vertices of the garment based on different criteria (e.g., the laws of physics, garment material properties, body-garment interaction). The result is a large system of equations (e.g., one variable for each force component) that the garment simulation module 246 can solve in an iterative fashion. The simulation can be completed when the simulation becomes stable. For example, the simulation can become stable when the garment reaches a steady state with a net force of zero.

In some arrangements, the simulated force can include a gravitational force, an elastic force, a friction force, or an aerodynamic force. Additionally, the garment simulation module can further calculate the one or more simulated forces acting on the subset of the garment points based on the material property of the garment. For example, the simulated one or more forces can include a gravitational force and an elastic force, and the material property of the garment indicates a degree to which the garment is elastic. The material property of the garment can include, but is not limited to, a sheerness value, a linear stiffness value, or a bending stiffness value.

Various embodiments may then be implemented through specific modules (e.g., the simulation module 266) stored in the memory 236. Some examples of implementations and equations are described below. For example, below is the system of equations to be used with operation 450 for a three-spring implementation of a sample triangle 550 with three vertices (i.e., a vertex 852, a vertex 854, and a vertex 856) associated with a tessellated garment model of shirt 810, as illustrated in FIG. 8.

$$spring_{force_1} = \left(\frac{k_s}{restlength_1}\right) * (|x_2 - x_1| - restlength_1) * spring_{direction_1} + \left(\frac{k_d}{restlength_1}\right) * Dot_{Product}(v_2 - v_1, spring_{direction_1}) * spring_{direction_1}$$ (Equation 1)

$$spring_{force_2}\left(\frac{k_s}{restlength_2}\right) * (|x_3 - x_2| - restlength_2) * spring_{direction_2} + \left(\frac{k_d}{restlength_2}\right) * Dot_{Product}(v_3 - v_2, spring_{direction_2}) * spring_{direction_2}$$ (Equation 2)

$$spring_{force_3}\left(\frac{k_s}{restlength_3}\right) * (|x_1 - x_3| - restlength_3) * spring_{direction_3} + \left(\frac{k_d}{restlength_3}\right) * Dot_{Product}(v_1 - v_3, spring_{direction_3}) * spring_{direction_3}$$ (Equation 3)

Where $k_s$ is the elastic spring constant, $k_d$ is the damping spring constant, and each vertex has a position (x) and velocity (v).

In the equations above, when the denominator is a restlength value, a non-zero value can be used for zero-length springs. Additionally, the equations can use a visual restlength value when the denominator is not the restlength value, which in zero-length spring cases is 0. This allows for the system to handle zero-length springs without dividing by 0.

To further explain the equations above, a walkthrough of the equations is described. The state that the simulation module can maintain is the positions and velocities of all the points that represent the garment. As the simulator moves forward in time, the simulator can update the positions of the points over time by computing the net force on each point at each instance in time. Then, based on the mass of the particle, the simulator can use the equation based on the laws of motion, F=ma, to calculate an acceleration. The acceleration determines a change in velocity, which can be used to update the velocity of each point. Likewise, the velocity determines a change in position, which can be used to update the positions. Therefore, at each point in the simulation, the simulator can compute the net force on each particle. The forces exerted on each particle can be based on a gravitational force, spring forces, or other forces (e.g., drag forces to achieve desired styling). The equation for gravitational force is F=mg, and the spring force is described above.

The spring force F has two components, an elastic component (e.g., the part of the equation multiplied by k_s) and a damping component (e.g., the part of the equation multiplied by k_d). The elastic component is related to the oscillation of the spring. The strength of the elastic force is proportional to the amount the spring is stretched from the restlength value, which can be determined by x2−x1 (e.g., the current length of the spring) minus the restlength value. For example, the more the spring is compressed or stretched, the higher the force pushing the spring to return to its rest state. Additionally, k_s is a spring constant that allows for scaling up/down the force based on the strength of the spring, which is then multiplied by the spring direction to give the force a direction (e.g., in the direction of the spring).

The damping component calculates the damping effect (e.g., heat being generated by the spring moving, drag). Damping can be drag force, where the higher the velocity, the higher the drag/damping force. Accordingly, damping can be proportional to velocity. In the case of a spring, there can be two particles moving, so instead of a single velocity the simulator computes a relative velocity between the two endpoints. For example, the larger the relative velocity, the faster the points are moving apart or coming close together, and as a result the larger the damping force (e.g., the damping is proportional to relative velocity). Additionally, k_d is the damping spring constant to scale the damping force up/down, which can be multiplied by the spring direction to give the force a direction.

In various example embodiments, an individual simulation can be run for each of the Nm or Nw bodies. The resultant output can be stored or displayed to a user. In some instances, for each of the bodies, the system can capture the position of the vertices at the end of the simulation, and store the information in a database. For a mesh with K vertices, a total of 3K numbers are stored (the x, y, and z positions for each vertex). These constitute the look of the given garment on any given body.

In various example embodiments, at the steady state of each simulation, the system can also compute the forces being exerted in the springs (e.g., edges) of the mesh. For example, for an edge between two vertices (e.g., V_1 and $[V]\_2$), the resultant force on V1 (and correspondingly V2) equals:

$$F(V\_1)=k(V\_1,V\_2)*\text{Delta}(V\_1\_V\_2), \text{ where} \quad \text{(Equation 4)}$$

k(V_1,V_2) is the spring constant of the spring joining V_1 and V_2 (e.g., a function of the material property of the garment); and Delta(V_1_V_2) is a velocity-dependent force function based on the change in position vectors for V_1,V_2 as compared to their original rest state.

These forces can then be then accumulated for each vertex to compute the resultant force.

In various example embodiments, for each of the bodies, the system 100 can store the resultant force on each vertex. The resultant force on each vertex can serve as a measure of the tightness (e.g., for large force magnitude) or looseness in different regions of the garment. The resultant force computed can be interpreted as a stress, pressure, or compression on the garment. This information may be used by a virtual dressing room to generate an accurate wearable item image.

Imaging module 248 can generate a two dimensional wearable item image from the three-dimensional garment model draped on the three-dimensional body model based on the calculated one or more simulated forces. For example, the imaging module 248 can generate a wearable item image from the tessellated 3-D garment model on a 3-D body model using the draping module 265 and the simulation module 266. The tessellated 3-D garment model is presented based on a simulated force. The presentation can be done by digitally draping the tessellated 3-D garment model onto a 3-D body model. In various example embodiments, a simulation may be performed by combining body and garment data for associated models, and inputting this information into a cloth simulation engine.

A display module 250 can then present the generated image on a display of a device. The display module 250 can configure the user interface 232 for the presentation. The display module 250 can configure at least one processor among the one or more processors (e.g., the CPU 222) to present the generated image on the display of a mobile device.

For example, as illustrated in FIG. 9, using the a body model and a garment model, a garment simulation module can generate a first partial shape corresponding to the front of a pair of jeans 910 and a second partial shape corresponding to the back of the jeans 920. Then, the digital garment creation module can determine that the received images are images of a pair of jeans by comparing the generated partial shapes to the jeans garment template in the garment template database 255. Moreover, based on the determination that the garment is a pair of jeans, the digital garment creation module can join the partial shapes to generate a 3-D pair of digital jeans 930. As will be further described herein, the 3-D pair of digital jeans 930 can be tessellated. Furthermore, the access module 244 can receive the tessellated garment model at technology package 104 along with body model information. Simulation module 246 may use this information to generate a model of the garment draped on the body model, and a wearable item image may be generated from a rendering of the model of the garment draped on the body model.

The simulation module 266 can take as input tessellation and material properties and can output images of wearable items draped on a body model as a wearable item image. Additionally, simulation module 246 may generate models of an environment, and use various modules such as segmentation module 130 to process the environment and generate an environment image with placement area data. The simulation module 266 can use digitization 1610, modeling 1620, simulation 1630, and automated 1640 techniques to generate a three-dimensional simulation of both wearable items and contexts. These are generated separately because of the massive number of images that would be needed for pre-generation of context images, if every available context was used with every available wearable item. This additionally enables separate generation of wearable item images using body models customized to a particular user. Still further, this enables a modular system where a user may provide their own context data to a system, for example by using a mobile phone camera to take a picture of a scene that may be sent to access module 244 and processed by simulation module 246.

For wearable items, the simulation module 266 can move points around to fit a 3-D body model based on a simulated force (e.g., friction, stitching force). Additionally, based on this modeling, the points are connected via springs and can be stretched based on a simulated force (e.g., gravity, material property of garment). The simulation module 266 can solve a system of equations, given that the equations are all inter-connected. In one example, the system of equations can be based on the spring force on each vertex.

FIGS. 10A-F then illustrate aspects of context integrated with body model and wearable item information as displayed in item context images on an example user interface.

Figure 10A:
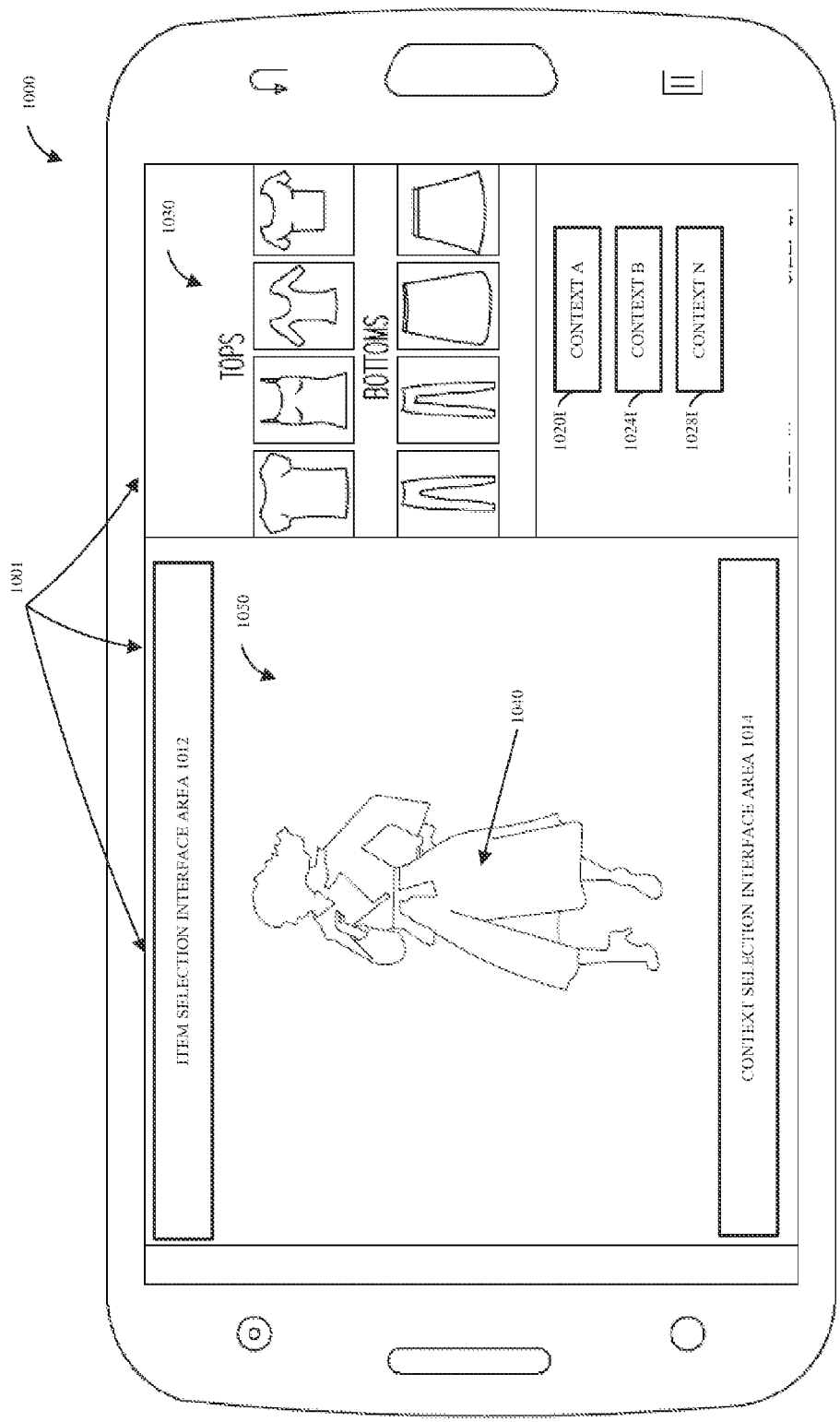
FIG. 10A illustrates aspects of a virtual fitting room that may be used with virtual contexts in accordance with certain example embodiments.

FIG. 10A shows mobile device 1000, which may be similar to device 202, devices 10, computing device 1200, or any other device described herein. Mobile device 1000 includes a touch screen display 1001 which functions both as an output display and a user interface. Touch screen display 1001 displays an image of a plurality of wearable items 1030, which may include an interface for selecting a wearable item as part of a virtual dressing room. In certain embodiments, selection of a wearable item 130 from touch screen display 1001 may be part of selection of a wearable item discussed above for operation 558.

Touch screen display 1001 also displays selection buttons for a plurality of environment images, each associated with a different context. These selection buttons are shown as section button 10201 associated with context A, selection button 10241 associated with context B, and selection button 10281 associated with context N. Virtual dressing room area 1050 outputs an image of selections made by a user. In FIG. 10A, virtual dressing room area 1050 shows Wearable item image 1040 with no context. In certain embodiment, a central area of virtual dressing room area 1050 may be associated with a user interface that enables a user to pan or rotate the image output in virtual dressing room area 1050. This may particularly be associated with embodiments where three dimensional models are used to generate wearable item images. In such embodiments, item selection interface area 1012 may be an interface used to scroll through item options.

A swiping interaction made across item selection interface area 1012 may be used to select a next wearable item in a queue. When such a user input is received, the device may receive a wearable item image for the newly selected item, and perform the superposition process for generating a context image.

Similarly, context selection interface area 1014 may enable a swiping interface to select a next or previous context from an order list of contexts. Receiving such an input at context selection interface area 1014 of mobile device 1014 may cause mobile device 1014 to access context data including an environment image and pre-generated placement area information, and to use this context data with the item data for a previously selected item, to generate a context image.

Figure 10B:
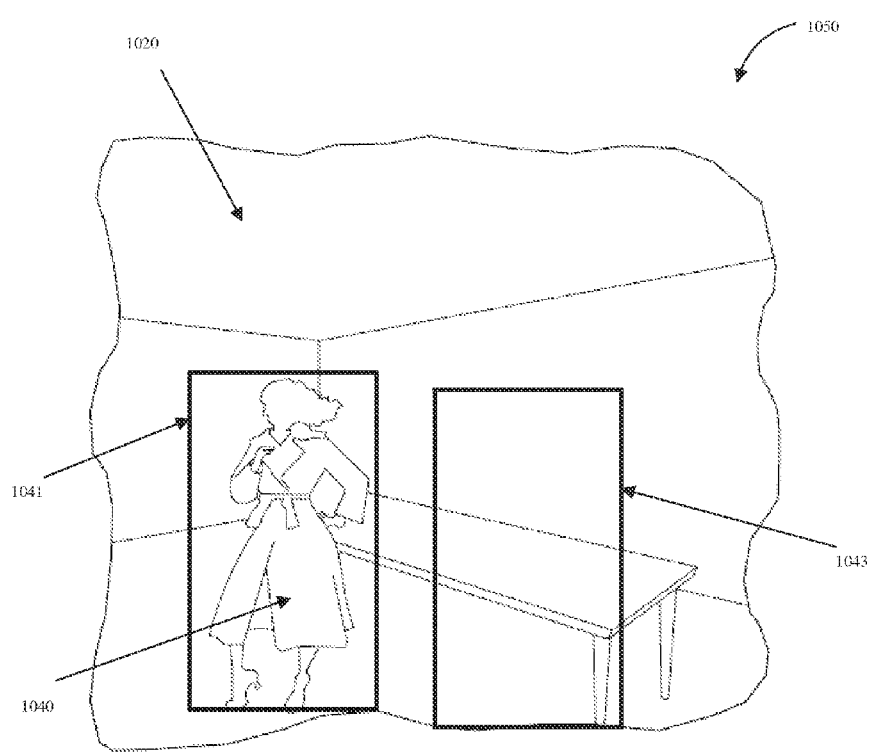
FIG. 10B illustrates aspects of a content image generated with virtual contexts in accordance with certain example embodiments.

FIG. 10B then shows virtual dressing room area 1050 displaying a context image generated using wearable item image 1040 and environment image 1020 associated with context A. First placement area 1041 is illustrated along with second placement area 1043. In certain embodiments, as described above, a user input may be used to generate a second context image with the same environment image and wearable item image, but using a different placement area. In certain embodiments, a user may input a user generated placement area using an interface of display 1001. This may also be used to generate a new context image based on the user generated placement area.

Figure 10C:
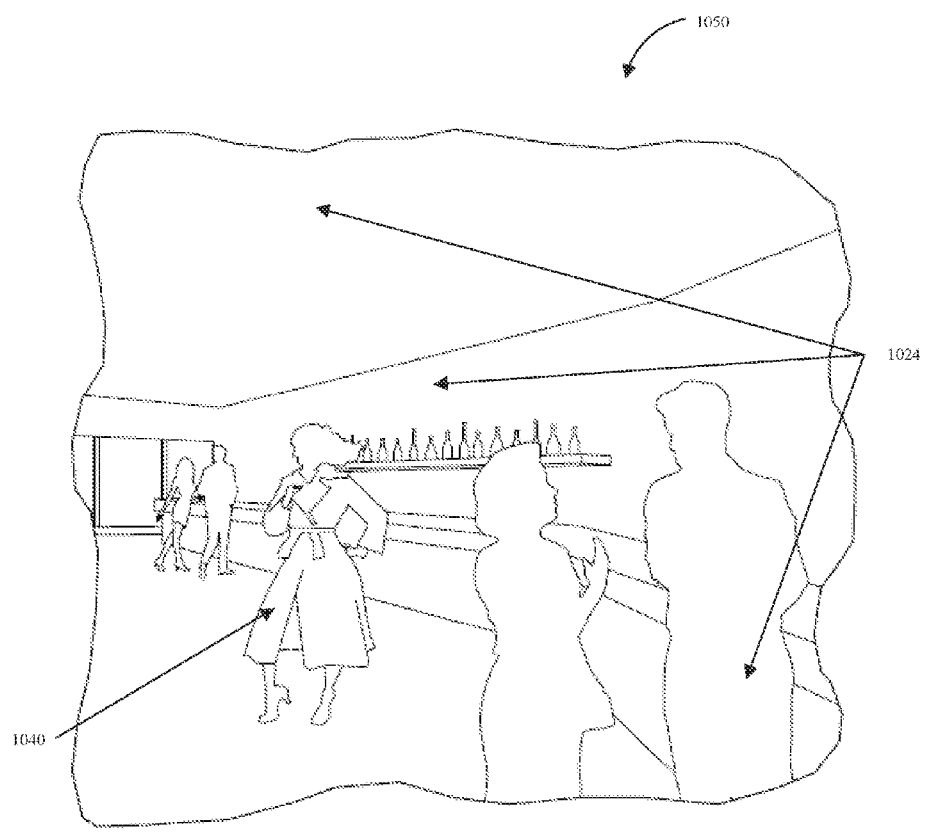
FIG. 10C illustrates aspects of a content image generated with virtual contexts in accordance with certain example embodiments.
Figure 10D:
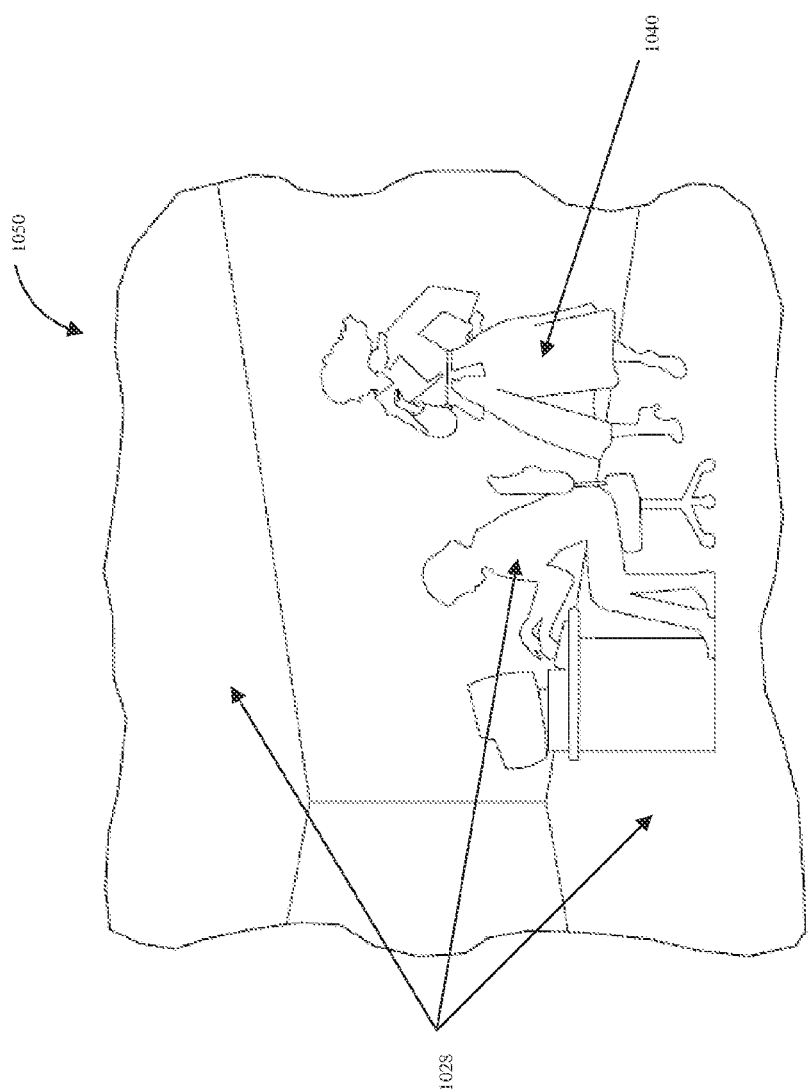
FIG. 10D illustrates aspects of a content image generated with virtual contexts in accordance with certain example embodiments.

FIG. 10C then shows virtual dressing room area 1050 displaying a context image generated from wearable item image 1040 and environment image 1024 associated with context B. FIG. 10D similarly shows virtual dressing room area 1050 displaying a context image generated from wearable item image 1040 and environment image 1028 associated with context N. Such different context images may be generated by an imaging module such as imaging module 248 in response to user selections and described above.

Figure 10F:
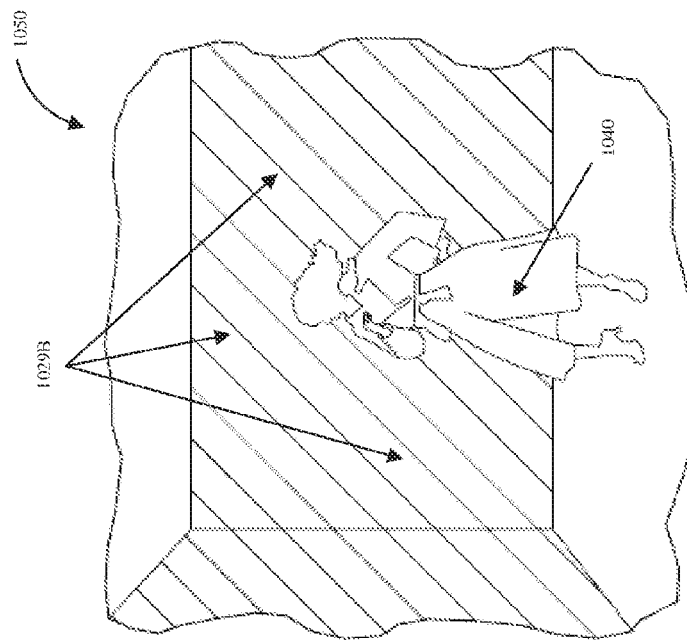
FIG. 10F illustrates aspects of a content image generated with virtual contexts in accordance with certain example embodiments.
Figure 10E:
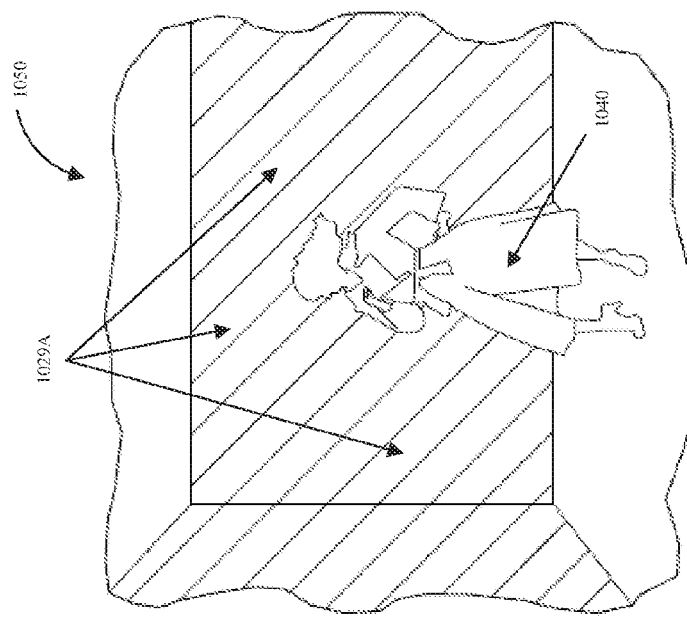
FIG. 10E illustrates aspects of a content image generated with virtual contexts in accordance with certain example embodiments.

Additionally, a user may provide information to generate or modify certain context information. FIGS. 10E and 10F both show a context image generated from wearable item image 1040 and the same context, but in environment image 1029A, a first segment has a first color and in environment image 1029B, the same first segment of the context has a second color different from the first color. A user input may thus be used to adjust an environment image. When such an adjustment occurs, the specifics of the boundary between the wearable item image and the environment image may change, and so the process of superimposing the wearable item image on the environment may change. Because the boundary and the erosion area will be the same, in certain embodiments, only the image filtering process may be performed to generate the new composite image when only a color of an environment segment is changed in response to a user input changing an environment segment color.

In various embodiments, the modules described herein may be stored in memory 236 in the computing device 202, as initially described in FIG. 1. Additional files and modules may be included in various embodiments for use in generating context images for output on a device. A file system 242 may include one or more of the following files: garment model files; extracted geometry files; extracted texture files; stitching information files; a garment template database; draping parameters files; simulation parameters files; and simulation result geometry files. Additional such modules may include a boundary extraction module; a texture mapping module; a tessellation module; a stitching module; a draping module; and a simulation module, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Each of the above identified elements may be stored in one or more of the previously mentioned memory devices, and corresponds to a set of instructions for performing a function described above. The above identified modules or programs (e.g., sets of instructions) need not be implemented as separate software programs, procedures, or modules, and thus various subsets of these modules may be combined or otherwise rearranged in various example embodiments. In some example embodiments, the memory 236 may store a subset of the modules and data structures identified above. Furthermore, the memory 236 may store additional modules and data structures not described above.

The actual number of servers used to implement the simulation module 246 and how features are allocated among them will vary from one implementation to another, and may depend in part on the amount of data traffic that the system 100 handles during peak usage periods as well as during average usage periods.

Figure 11:
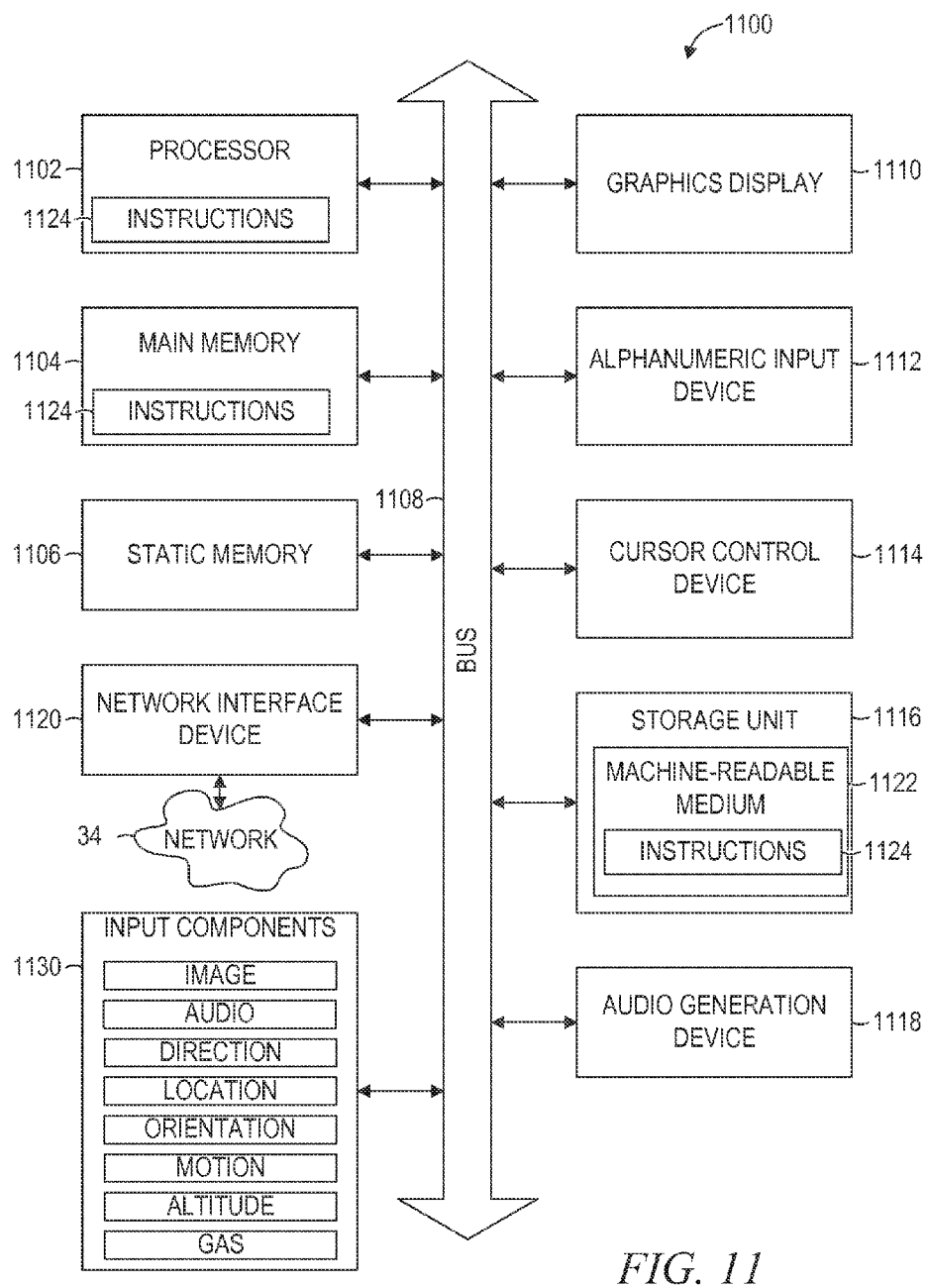
FIG. 11 is a block diagram illustrating components of a computing device, according to some example embodiments, able to read instructions from a machine-readable medium and perform any one or more of the methodologies discussed herein.

FIG. 11 is a block diagram illustrating components of a computing device 1100, according to some example embodiments, able to read instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the computing device 1100 in the example form of a computer system (e.g., a computer) within which the instructions 1124 (e.g., software, a program, an application, an applet, an app, or other executable code) for causing the computing device 1100 to perform any one or more of the methodologies discussed herein may be executed, in whole or in part. The computing device 202, merchant server system 502, and client device 510 may all be implemented using at least one computing device 1100, or different elements of computing device 1100 described below.

In alternative embodiments, the computing device 1100 operates as a standalone device or may be connected (e.g., networked) to other machines. In a networked deployment, the computing device 1100 may operate in the capacity of a server machine or a client machine in a server-client network environment, or as a peer machine in a distributed (e.g., peer-to-peer) network environment. The computing device 1100 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The computing device 1100 includes a processor 1102 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The computing device 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The computing device 1100 may also include an alphanumeric input device 1112 (e.g., a keyboard or keypad), a cursor control device 1114 (e.g., a mouse, a touchpad, a trackball, a joystick, a motion sensor, an eye tracking device, or other pointing instrument), a storage unit 1116, an audio generation device 1118 (e.g., a sound card, an amplifier, a speaker, a headphone jack, or any suitable combination thereof), and a network interface device 1120.

The storage unit 1116 includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the processor 1102 (e.g., within the processor's cache memory), or both, before or during execution thereof by the computing device 1100. Accordingly, the main memory 1104 and the processor 1102 may be considered machine-readable media (e.g., tangible and non-transitory machine-readable media). The instructions 1124 may be transmitted or received over the network 34 via the network interface device 1120. For example, the network interface device 1120 may communicate the instructions 1124 using any one or more transfer protocols (e.g., hypertext transfer protocol (HTTP)).

The machine-readable medium 1122 may include a magnetic or optical disk storage device, solid state storage devices such as flash memory, or other non-volatile memory device or devices. The computer-readable instructions stored on the computer-readable storage medium are in source code, assembly language code, object code, or another instruction format that is interpreted by one or more processors.

In some example embodiments, the computing device 1100 may be a portable computing device, such as a smartphone or tablet computer, and have one or more additional input components 1130 (e.g., sensors or gauges). Examples of such input components 1130 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein. In certain embodiments, input components 1130 may be used to generate context data including environment images, and wearable item data such as raw wearable item images. Raw wearable item images may be processed with a body model to generate a wearable item image usable by the system by, for example, eliminating background information from the raw wearable item image.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store the instructions 1124. The term "machine-readable medium" shall also be taken to include any medium, or combination of multiple media, that is capable of storing the instructions 1124 for execution by the computing device 1100, such that the instructions 1124, when executed by one or more processors of the computing device 1100 (e.g., the processor 1102), cause the computing device 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

The foregoing description, for purposes of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements." "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
   an access module implemented by at least one processor and configured to:
   access a set of context data, the set of context data comprising a first environment image depicting a first environment;
   a simulation module implemented by the at least on processor, the simulation module in communication with the access module and configured to:
   segment the first environment image of the environment into a first plurality of segments;
   identify a first ground segment from the first plurality of segments;
   identify a plurality of unobstructed portions of the first ground segment;
   for each of the plurality of unobstructed portions of the first ground segment, determine an unobstructed distance from the unobstructed portion toward a ceiling segment;
   identify a plurality of placement areas comprising at least a first placement area within the first environment image based on the first ground segment and a first set of placement cues associated with the first plurality of segments; and
   select the first placement area from a plurality of placement areas based at least in part on a proximity of the first placement area to a set of obstruction segments and a set of relevant context segments of the plurality of segments; and
   an imaging module implemented by the at least one processor and configured to:
   superimpose a wearable item image on the first environment image to generate a first item context base image, wherein the wearable item image is placed within the first placement area by scaling an item size of the wearable item image to match a placement size of the first placement area and to match an item scale to an environment scale and by downsampling the wearable item image to match a wearable item image pixel resolution to a first environment image resolution, and wherein the wearable item image comprises a simulated image of a wearable item modeled with zero-length springs;
   identify a first erosion area in the first item context base image, the first erosion area comprising at least a portion of a boundary between the first environment image and the wearable item image; and
   perform an image filtering process on the erosion area to generate a first context image comprising at least a portion of the wearable item image and a portion of the first environment image.

2. The system of claim 1 further comprising:
   a mobile device comprising at least one processor and a memory coupled to the at least one processor, wherein the mobile device further comprises the access module, the simulation module, and the imaging module.

3. The system of claim 2 wherein the mobile device further comprises a camera module coupled to the access module, wherein the camera module is configured to capture the first environment image.

4. The system of claim 3 further comprising a display module coupled to the imaging module, wherein the display module is configured to output first context image on a display of the mobile device.

5. The system of claim 4 wherein the mobile device further comprises a user interface module configured to:
   receive a first user input selecting the wearable item from a virtual marketplace interface of the user interface module; and
   receive a second user input selecting a second wearable item from the virtual marketplace interface of the user interface module.

6. The system of claim 5 wherein the mobile device further comprises an antenna coupled to the access module and the at least one processor;
   wherein the access module is further configured to:
   receive the wearable item image from a network via the antenna; and
   receive a second wearable item image from the network via the antenna, wherein the second wearable item image represents the second wearable item, and wherein the second wearable item is different than the wearable item.

7. The system of claim 6 wherein the imaging module is further configured to:
   superimpose the second wearable item image on the first environment image to generate a second item context base image, wherein the second wearable item image is placed within the first placement area;
   identify a second erosion area in the second item context base image, the second erosion area comprising at least a portion of a boundary between the first environment image and the second wearable item image; and
   perform the image filtering process on the second erosion area to generate a second context image comprising at least a portion of the second wearable item image and a second portion of the first environment image.

8. The system of claim 1 further comprising:
   a first computing device comprising imaging module and a display module that outputs the first context image to a display of the first computing device;
   a server computer communicatively coupled to the first computing device via a network, the server computer comprising the access module and the simulation module; and a database comprising the set of context data, wherein the access module receives the set of context data from the database.

9. The system of claim 8 wherein the set of context data further comprises a second environment image depicting a second environment different than the first environment;
wherein the simulation module is further configured to:
segment the second environment image into a second plurality of segments;
identify a second ground segment from the second plurality of segments; and
determine at least a second placement area within the second environment image based on the second ground segment and a second set of placement cues associated with the second plurality of segments.

10. The system of claim 9 wherein the first computing device further comprises a user interface module configured to:
receive a first user input selecting the first environment image, wherein the first context image is generated and displayed on the display in response to the first user input; and
receive a second user input, following display of the first context image, selecting the second environment image, wherein in response to the second user input the imaging module is configured to:
superimpose the second wearable item image on the first environment image to generate a second item context base image, wherein the wearable item image is placed within the second placement area;
identify a second erosion area in the second item context base image, the second erosion area comprising at least a portion of a boundary between the second environment image and the wearable item image;
perform the image filtering process on the second erosion area to generate a second context image comprising at least a second portion of the wearable item image and a portion of the second environment image; and
communicate the second context image to the display module to replace the first context image on the display.

11. A method comprising:
accessing, at an access module of a device comprising at least one processor and a memory coupled to the at least one processor, a set of context data, the set of context data comprising a first environment image depicting a first environment;
segmenting, by a simulation module communicatively coupled to the access module, the first environment image of the environment into a first plurality of segments;
identifying a first ground segment from the first plurality of segments;
determining at least a first placement area within the first environment image based on the ground segment and a first set of placement cues associated with the first plurality of segments;
superimposing, by an imaging module, a wearable item image on the first environment image to generate a first item context base image, wherein the wearable item image is placed within the first placement area, and wherein the wearable item image comprises a simulated image of a wearable item modeled with zero-length springs;
identifying a first erosion area in the first item context base image, the first erosion area comprising at least a portion of a boundary between the first environment image and the wearable item image in the first item context base image; and
performing an image filtering process on the erosion area to generate a first context image comprising the image of the clothed body model and a portion of the environment;
wherein superimposing the wearable item image on the first environment image to generate a first item context base image comprises:
scaling an item size of the wearable item image to match a placement size of the first placement area and to match an item scale to an environment scale;
downsampling the wearable item image to match a wearable item image pixel resolution to a first environment image resolution; and
superimposing a scaled downsampled wearable item image over at least a portion of the first placement area of the first environment image;
wherein identifying the first erosion area in the first item context base image comprises:
identifying boundary pixels by identifying each pixel of the first item context base image that is:
a superimposed pixel from the wearable item image; and
adjacent to at least one pixel from the first environment image; and
wherein identifying the first erosion area in the first item context base image further comprises:
determining a ratio of a size of the wearable item image to a size of the first environment image;
selecting an erosion distance from an erosion distance table based on the ratio;
selecting every pixel within the erosion distance of the boundary pixels as a set of erosion pixels comprising the first erosion area.

12. The method of claim 11 wherein determining at least the first placement area comprises:
identifying a plurality of unobstructed portions of the first ground segment;
determining an unobstructed distance from the unobstructed portion toward a ceiling segment for each placement area of the plurality of unobstructed portions of the first ground segment;
identifying a plurality of placement areas comprising the first placement area from the plurality of unobstructed portions of the first ground segment and the associated unobstructed distance toward the ceiling segment for each unobstructed portions;
selecting the first placement area from plurality of placement areas based at least in part on a proximity of the placement area to a set of obstruction segments and a set of relevant context segments of the plurality of segments.

13. The method of claim 11 wherein the image filtering process comprises a Gaussian smoothing process by transforming each pixel of the set of erosion pixels using a Gaussian filter.

14. The method of claim 11 further comprising:
accessing, from a database, a three-dimensional garment model of a garment, the three-dimensional garment model including garment points that represent a surface of the garment;
accessing a body measurement of a person;
generating, using a processor, a three-dimensional body model based on the body measurement;
positioning at least a portion of the generated three-dimensional body model inside the garment points;

calculating one or more simulated forces acting on a subset of the garment points based on the positioning of the generated three-dimensional body model inside the garment points;

generating the wearable item image as a first image of the three-dimensional garment model draped on the three-dimensional body model based on the calculated one or more simulated forces.

15. A non-transitory computer readable medium comprising instructions that, when executed by at least one processor, cause a device to:

access a set of context data, the set of context data comprising a first environment image depicting a first environment;

segment the first environment image of the environment into a first plurality of segments;

identify a first ground segment from the first plurality of segments;

identify a plurality of unobstructed portions of the first ground segment;

for each placement area of the plurality of unobstructed portions of the first ground segment, determine an unobstructed distance from the unobstructed portion toward a ceiling segment;

identify a plurality of placement areas comprising a first placement area from the plurality of unobstructed portions of the first ground segment and the associated unobstructed distance toward the ceiling segment for each unobstructed portions;

select the first placement area from plurality of placement areas based at least in part on a proximity of the placement area to a set of obstruction segments and a set of relevant context segments of the plurality of segments;

scale an item size of a wearable item image to match a placement size of the first placement area and to match an item scale to an environment scale, wherein the wearable item image comprises a simulated image of a wearable item modeled with zero-length springs;

downsample the wearable item image to match a wearable item image pixel resolution to a first environment image resolution;

superimpose a scaled downsampled wearable item image over at least a portion of the first placement area of the first environment image to generate a first item context base image;

identify a first erosion area in the first item context base image, the first erosion area comprising at least a portion of a boundary between the first environment image and the wearable item image; and perform an image filtering process on the erosion area to generate a first context image comprising at least a portion of the wearable item image and a portion of the first environment image.

16. The non-transitory computer readable medium of claim 15 wherein the image filtering process comprises a Gaussian smoothing process by transforming each pixel of the set of erosion pixels using a Gaussian filter.

17. The non-transitory computer readable medium of claim 15 wherein the instructions further cause the device to:

capture the first environment image;

output first context image on a display of the mobile device;

receive a first user input selecting the wearable item from a virtual marketplace interface of the user interface module; and receive a second user input selecting a second wearable item from the virtual marketplace interface of the user interface module.

18. The non-transitory computer readable medium of claim 15 wherein the instructions further cause the device perform operations comprising:

accessing, from a database, a three-dimensional garment model of a garment, the three-dimensional garment model including garment points that represent a surface of the garment;

accessing a body measurement of a person;

generating, using a processor, a three-dimensional body model based on the body measurement;

positioning at least a portion of the generated three-dimensional body model inside the garment points;

calculating one or more simulated forces acting on a subset of the garment points based on the positioning of the generated three-dimensional body model inside the garment points;

generating the wearable item image as a first image of the three-dimensional garment model draped on the three-dimensional body model based on the calculated one or more simulated forces.

19. The non-transitory computer readable medium of claim 15 wherein the simulated image of the wearable item is further modeled using a tessellated garment model of the wearable item.

20. The non-transitory computer readable medium of claim 15 wherein the simulated image of the wearable item is further modeled using a three-spring implementation of a sample triangle within the tessellated garment model of the wearable item; and wherein the zero-length springs comprise one or more springs within the tessellated garment model.

* * * * *